US008078720B2

(12) United States Patent
Kawana

(10) Patent No.: US 8,078,720 B2
(45) Date of Patent: Dec. 13, 2011

(54) MANAGEMENT OF NETWORKED DEVICES

(75) Inventor: Yoshimasa Kawana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 915 days.

(21) Appl. No.: 11/945,195

(22) Filed: Nov. 26, 2007

(65) Prior Publication Data

US 2008/0140831 A1 Jun. 12, 2008

(30) Foreign Application Priority Data

Dec. 11, 2006 (JP) .................. 2006-333868

(51) Int. Cl.
*G06F 13/00* (2006.01)
(52) U.S. Cl. ....................................... 709/224
(58) Field of Classification Search .................. 709/224
See application file for complete search history.

(56) References Cited

U.S. PATENT DOCUMENTS 6,401,116 B1 * 6/2002 Okigami ................. 709/223

FOREIGN PATENT DOCUMENTS

| JP | 7137358 | 5/1995 |
| JP | 11-353145 A | 12/1999 |
| JP | 2003-108417 A | 4/2003 |
| JP | 2006-072792 A | 3/2006 |
| JP | 2006-092301 A | 4/2006 |
| JP | 2006-099300 A | 4/2006 |
| JP | 2006-099556 A | 4/2006 |
| JP | 2006-099609 A | 4/2006 |
| JP | 2006-227975 A | 8/2006 |

OTHER PUBLICATIONS

Japanese Office Action dated Aug. 15, 2011 concerning Japanese Patent Application No. 2006-333868.

* cited by examiner

*Primary Examiner* — Robert B Harrell
(74) *Attorney, Agent, or Firm* — Fitzpatrick, Cella, Harper & Scinto

(57) ABSTRACT

The present invention improves the efficiency with which the resources of a device monitoring system are used.

A management server stores a device type-dependent database and a monitored device database for devices that are to be monitored by a device monitoring module. The types of information that can be processed by the management server and so on are stored in the device type-dependent database per device type. When this database is updated, notification setting information specifying information that the device is to notify the management server of is created in accordance with the details of the update and sent to the management server. The device sends events and other data to the management server in accordance with the notification setting information.

11 Claims, 17 Drawing Sheets

| | |
|---|---|
| SYSTEM PROGRAM (OS) | 501 |
| DEVICE MANAGEMENT PROGRAM | 502 |
| USER INTERFACE PROGRAM (MASTER DATA INPUT PROCESS) | 503 |
| USER / MANAGEMENT DEVICE AUTHENTICATION PROGRAM | 504 |
| MESSAGE SENDING / RECEIVING PROGRAM | 505 |
| RECEIVED COMMAND ANALYSIS PROGRAM | 506 |
| VARIOUS PROCESSING PROGRAM | 507 |
|    REQUEST SENDING PROCESSING PROGRAM | 508 |
|    NOTIFICATION SETTING INFORMATION SENDING PROCESSING PROGRAM | 509 |
|    STATUS RECEIVING PROCESSING PROGRAM | 510 |
|    . . . | |
| . . . | |
| DEVICE TYPE-DEPENDENT DEVICE MASTER DATA DB | 511 |
|    DEVICE TYPE BASIC INFORMATION | 512 |
|    DEVICE TYPE-DEPENDENT ERROR INFORMATION | 513 |
|    DEVICE TYPE-DEPENDENT ALARM INFORMATION | 514 |
|    DEVICE TYPE-DEPENDENT JAM INFORMATION | 515 |
|    DEVICE TYPE-DEPENDENT PARTS INFORMATION | 516 |
|    . . . | |
| MONITORED DEVICE MASTER DATA DB | 517 |
|    DEVICE ID | 518 |
|    DEVICE TYPE INFORMATION | 519 |
|    MONITORING ACTIVITY FLAG | 520 |
|    SENDING SETTING INFORMATION | 521 |
|    . . . | |

| NOTIFICATION SETTING INFORMATION | |
|---|---|
| EVENT TYPE DATA | ~703 |
| DEVICE TYPE-DEPENDENT ERROR CODE | ~704 |
| SENDING SETTING : ON | ~705 |
| . . . | |
| EVENT TYPE DATA | ~706 |
| DEVICE TYPE-DEPENDENT ALARM CODE | ~707 |
| SENDING SETTING : OFF | ~708 |
| . . . | |
| EVENT TYPE DATA | ~709 |
| DEVICE TYPE-DEPENDENT JAM CODE | ~710 |
| SENDING SETTING : ON | ~711 |
| . . . | |
| EVENT TYPE DATA | |
| DEVICE TYPE-DEPENDENT PARTS CODE | |
| SENDING SETTING : ON | |
| . . . | |
| SCHEDULE TYPE DATA | ~715 |
| PRINT COUNTER DATA | ~716 |
| SENDING SETTING : ON | ~717 |
| SENDING START TIME | ~718 |
| SENDING INTERVAL | ~719 |
| . . . | |
| SCHEDULE TYPE DATA | ~720 |
| DEVICE SETTING INFORMATION | ~721 |
| SENDING SETTING : ON | ~722 |
| SENDING START TIME | ~723 |
| SENDING INTERVAL | ~724 |
| . . . | |
| SCHEDULE TYPE DATA | ~725 |
| COMMAND OBTAINMENT REQUEST | ~726 |
| SENDING SETTING : ON | ~727 |
| SENDING START TIME | ~728 |
| SENDING INTERVAL | ~729 |
| . . . | |

FIG. 9

Product A - MASTER DATA — 901

- DEVICE TYPE BASIC INFORMATION — 902
- TONER INFORMATION — 903
  - Product A - Black Toner — 904
  - Product A - Cyan Toner — 905
  - Product A - Magenta Toner — 906
  - Product A - Yellow Toner — 907
- ERROR INFORMATION — 908
  - E123 : COMMUNICATION CABLE DISCONNECTED — 909
  - E222 : ABNORMAL POWER DETECTED — 910
  - . . .
- ALARM INFORMATION — 911
  - A123 : SCANNER GLASS DIRTY — 912
  - A222 : NO STAPLES — 913
  - . . .
- JAM INFORMATION — 914
  - J123 : FINISHER JAM — 915
  - J222 : FEED TRAY JAM — 916
  - . . .
- PARTS INFORMATION — 917
  - P123 : DRUM — 918
  - P222 : ELECTROSTATIC ROLLER — 919
  - . . .
- TIME OF LATEST UPDATE — 920
- TIME WHEN INITIAL DATA WAS CREATED — 921

- MONITORED DEVICE A - MASTER DATA
  - DEVICE ID — 1102
  - DEVICE TYPE INFORMATION : PRODUCT A — 1103
  - MONITORING ACTIVITY FLAG — 1104
  - NOTIFICATION SETTING INFORMATION — 1105
    - ...
  - CUSTOMER INFORMATION — 1106
    - CUSTOMER NAME — 1107
    - MANAGER NAME — 1108
    - INSTALLATION LOCATION — 1109
    - ...
  - NETWORK INFORMATION — 1110
    - DEVICE NAME — 1111
    - IP Adress — 1112
    - MAC Adress — 1113
    - ...
  - ADMINISTRATOR INFORMATION — 1114
    - ADMINISTRATOR NAME — 1115
    - ADMINISTRATOR E-MAIL ADDRESS — 1116
    - DEPLETED SUPPLY MANAGER NAME — 1117
    - DEPLETED SUPPLY MANAGER E-MAIL ADDRESS — 1118
    - ...
- SETTING VALUE UPDATE FLAG — 1119
- TIME OF LATEST UPDATE — 1120
- TIME WHEN INITIAL DATA WAS CREATED — 1121

| | |
|---|---|
| SYSTEM PROGRAM (OS) | 1801 |
| DEVICE MANAGEMENT PROGRAM | 1802 |
| MESSAGE SENDING / RECEIVING PROGRAM | 1803 |
| RECEIVED COMMAND ANALYSIS PROGRAM | 1804 |
| NOTIFICATION SETTING INFORMATION ANALYSIS PROGRAM | 1805 |
| VARIOUS PROCESSING PROGRAM | 1806 |
|    EVENT INFORMATION SENDING PROCESSING | 1807 |
|    SCHEDULE INFORMATION SENDING PROCESSING | 1808 |
|    COUNTER INFORMATION SENDING PROCESSING | 1809 |
|    SCHEDULE SETTING CHANGING PROCESSING | 1810 |
|    . . . | |
| DEVICE ID | 1811 |
| . . . | |
| DEVICE STATUS DB | 1812 |
|    DEVICE BASIC INFORMATION | 1813 |
|    ERROR INFORMATION | 1814 |
|    ALARM INFORMATION | 1815 |
|    JAM INFORMATION | 1816 |
|    PARTS INFORMATION | 1817 |
|    . . . | |
| DEVICE COUNTER DATA DB | 1818 |
|    BILLING COUNTER INFORMATION | 1819 |
|    FUNCTION COUNTER INFORMATION | 1820 |
|    . . . | |
| PROGRAM LOAD AREA | 1821 |

MANAGEMENT OF NETWORKED DEVICES

BACKGROUND OF THE INVENTION

1. Field of the Invention

The present invention relates to a managing apparatus and management method utilizing, for example, network communication, and relates particularly to a managing apparatus and management method that remotely controls data sent by a device monitoring program monitoring a device via a network.

2. Description of the Related Art

A conventional maintenance system, in which a management server is installed on the Internet and the system manages a client device via a network, is known. In this conventional maintenance system, the management server collects, for example, information on the device status, number of sheets to be printed, or the like sent from a device monitoring apparatus installed at the same site as the monitored device, and manages the device based thereupon. In such a case, collection condition information required for managing devices, such as, for example, scheduling settings regarding what sort of information is to be sent to the management server, is set up by the installer when the device monitoring apparatus is installed. It should be noted here that programs for monitoring a device have been run by the device itself as of late. In such a case, the device monitoring apparatus is installed within the device itself. Accordingly, rather than using the term "device monitoring apparatus", the term "device monitoring module" shall be used in the following descriptions. "Device monitoring module" includes both an independent device monitoring apparatus as well as a device monitoring apparatus installed within a device.

There have been cases where, in such a maintenance system, the inefficiencies found in communication, hardware, and the like, which do not pose problems when managing a small number of devices, have a great effect on the system when the management server manages a large number of devices. In response to this, Japanese Patent Laid-Open No. H07-137358 (Patent Document 1) discloses a technique for avoiding redundant communication by selecting and setting the details of notifications provided from the monitoring apparatus to the monitored apparatuses.

However, the technique disclosed in Patent Document 1 cannot be applied in cases such as where the information required for performing maintenance changes dynamically. For example, a user may determine that information regarding printer jamming is not necessary in the initial settings, and sets this information so as not to be communicated from the monitored apparatus. However, under these settings, the system cannot respond to a situation in which the information regarding printer jamming becomes necessary later on. In particular, when there are many monitored devices, all of the notifications may end up being set to ON when using the technique described in Patent Document 1.

SUMMARY OF THE INVENTION

Having been conceived in light of the problems with the abovementioned conventional example, it is an object of the present invention to provide a maintenance scheme by which efficient hardware and network resource operations can be carried out in a dynamic manner.

In order to realize this object, the present invention is configured as follows.

A managing apparatus capable of communication with a plurality of managed devices, the managed devices being managed by the managing apparatus, and the managing apparatus comprising: a first receiving means that receives a status code from a managed device; an obtainment means that obtains maintenance information associated with the status code received by the first receiving means, from a storage means that stores maintenance information associated with the status code; an output means that outputs the maintenance information obtained by the obtainment means so as to be visible; an update determination means that determines whether or not the maintenance information stored in the storage means has been updated; and a specification means that, in the case where the update determination means has determined that the maintenance information has been updated, specifies, to the managed device, notification setting information that includes notification settings for the status code corresponding to the updated maintenance information.

The present invention has an effect whereby it can provide a maintenance scheme by which efficient hardware and network resource operations can be carried out in a dynamic manner.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram illustrating an example of a storage configuration of a management server 106 according to an embodiment of the present invention.

FIG. 7 is a diagram illustrating an example of information sent from a management server 106 to a managed device according to an embodiment of the present invention.

FIG. 9 is a diagram illustrating product information of a managed device held by a management server 106 according to an embodiment of the present invention.

FIG. 10 is a diagram illustrating individual management information of a managed device held by a management server 106 according to an embodiment of the present invention.

FIG. 12 is a diagram illustrating an example of a storage configuration of a device according to an embodiment of the present invention.

DESCRIPTION OF THE EMBODIMENTS

Figure 1:
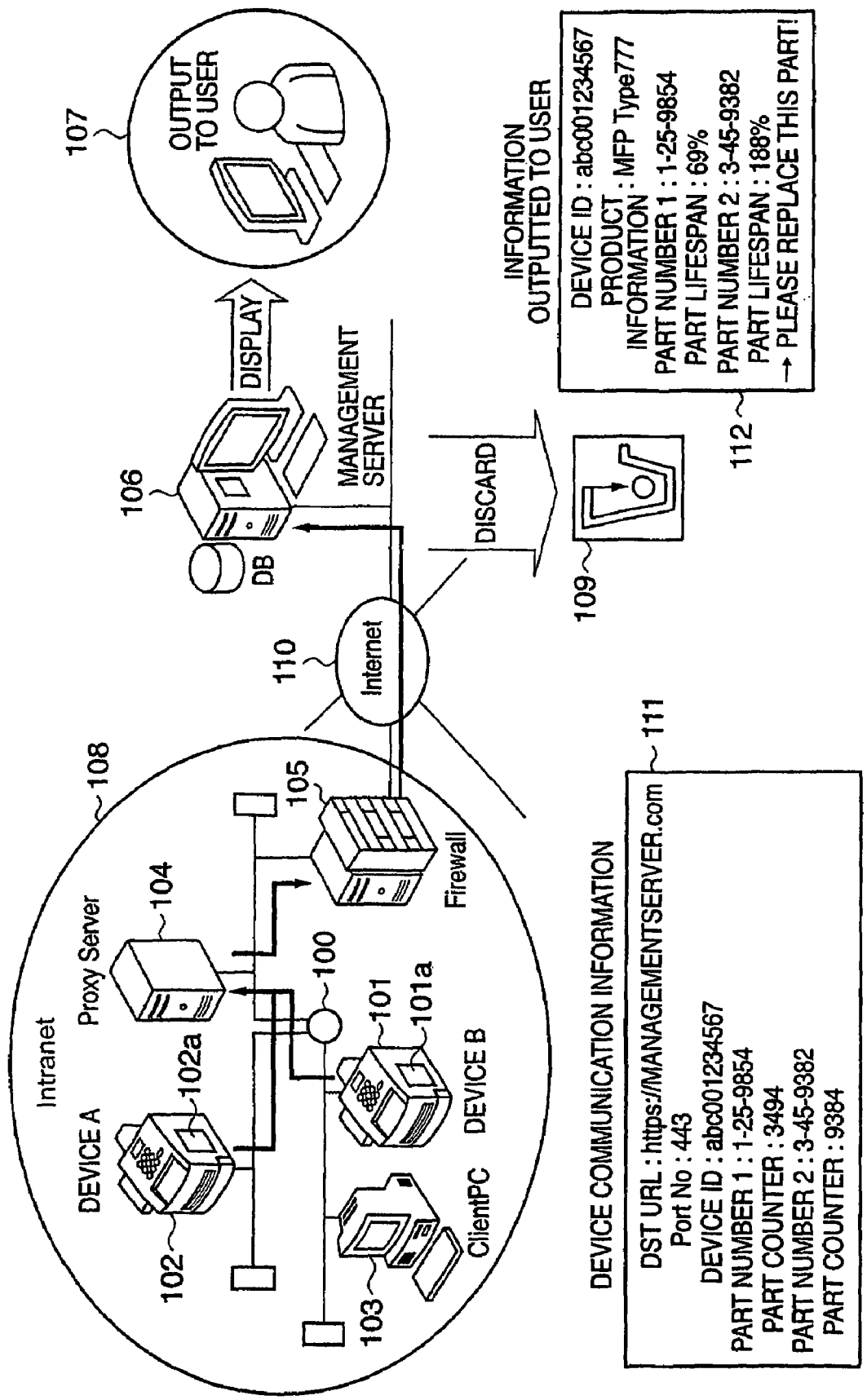
FIG. 1 is a diagram illustrating a relationship between connections in which a copy machine, a managed device, and a management server 106 are connected via the Internet, according to an embodiment of the present invention.

Example of Overall Configuration of Device Management System of Present Embodiment In FIG. 1, a system 108 indicates a customer network system (intranet). In this intranet, a firewall 105, which is the connection point with the Internet, is provided (installed). In addition, a proxy server 104 is installed so that a single machine can control HTTP or HTTPS communication to the exterior. The firewall 105 can prevent unauthorized network access from the exterior, and upholds security thereby.

Devices 101 and 102 represent MFPs (multi-function printers) or SFPs (single-function printers) installed on the customer network, and are managed devices. Machines such as these, which have functions for printing, copying, and so on, shall be called "devices" hereinafter. Device monitoring modules 101a and 102a are installed in the respective devices. The device monitoring module monitors the status of the device, and communicates this to an external management server 106. Furthermore, because the device monitoring module is a program that monitors the device, it may be installed in and executed by the device itself, or may be installed in and executed by a PC, dedicated hardware, or the like. A client 103 represents a personal computer (PC) used by a general user for various tasks. Many other customer networks resembling the intranet 108 are connected to the Internet 110.

The management server 106 collects and manages the device information by communicating with device monitoring modules installed in the various customer networks connected to the Internet. The device information collected by the management server 106 (called "management information" hereinafter) includes a device's operating information such as various operating mode settings, counter values, operating logs, counter values indicating usage amount (usage frequency) of various parts, as well as failure information regarding failures, jamming, and so on. The management server 106 also updates notification setting information, provides commands for rebooting, and so on for each of the devices. Communication using SOAP, or Simple Object Access Protocol, which utilizes protocols such as HTTP or HTTPS, is used here as a means of communication. SOAP is a protocol for carrying out communication between objects via a network. In SOAP, there is a defined data structure written in XML; HTTP or SMPT are used in SOAP as transfer protocols. A SOAP processor provided in the management server 106 analyzes (parses) objects described in accordance with SOAP, and executes processing. The management server 106 issues commands to the device monitoring modules in order to control the device monitoring modules and the devices.

A manager 107 of the management server 106 can cause the management information collected from the monitored devices to be displayed as a monitoring screen in a display unit, making it possible to monitor the statuses of the devices. An example of the management information is indicated by management information 111 in FIG. 1, while an example of the monitoring screen is indicated by a monitoring screen 112 in FIG. 1.

The notification setting information is information in which the type of information to be sent to the management server by the device monitoring module, the timing (schedule) of the send, and so on are denoted. The device monitoring module sends information indicating the status and so on of the device to the management server 106 according to a schedule specified in accordance with that information, in response to notification setting information provided by the management server 106.

<Block Diagram of Hardware Configuration of Information Processing Apparatus>

Figure 3:
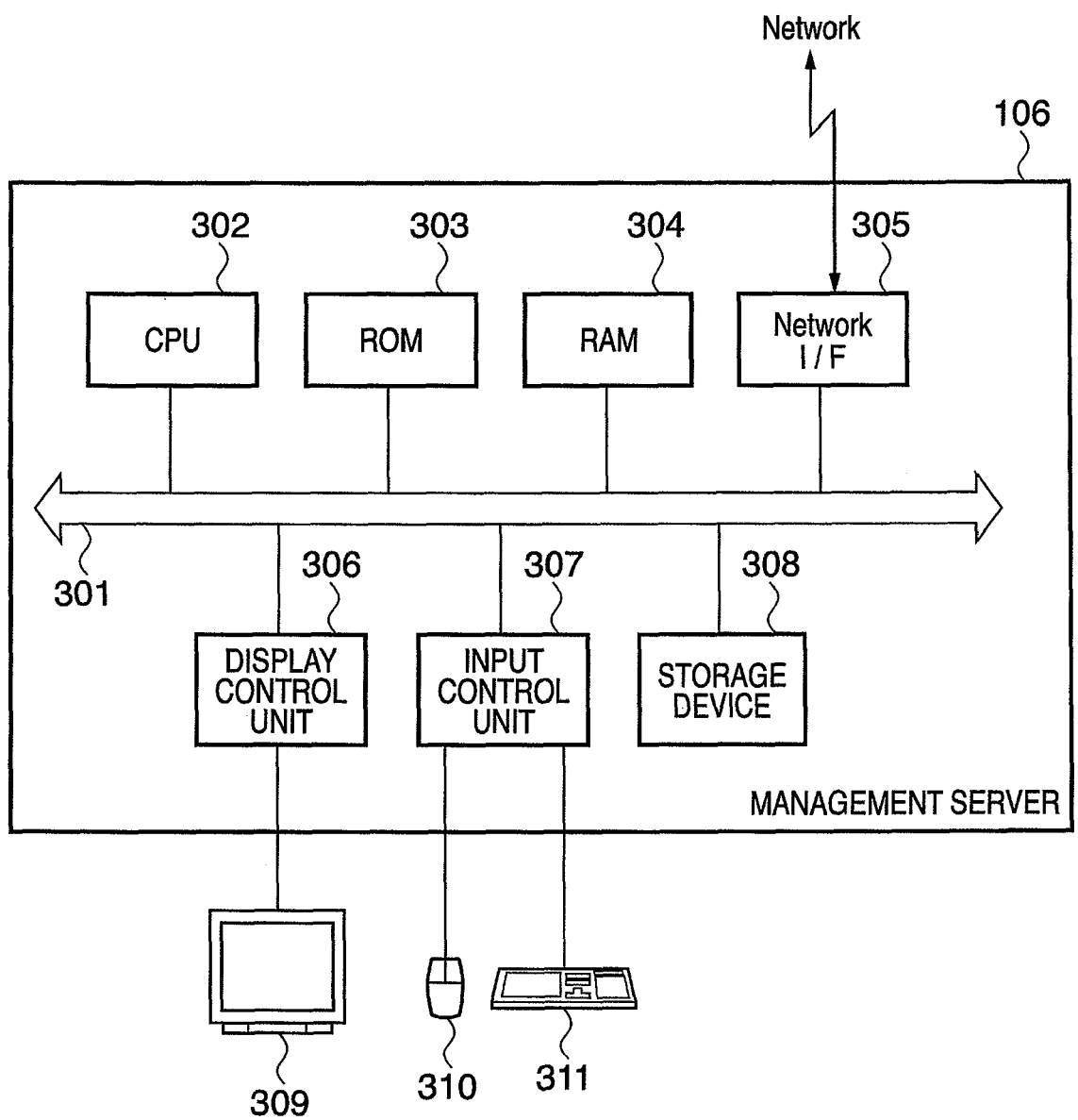
FIG. 3 is a block diagram illustrating an example of a hardware configuration of a management server 106 according to an embodiment of the present invention.

FIG. 3 is a block diagram illustrating a general hardware configuration of an information processing apparatus. This is equivalent to, for example, the hardware configuration of the management server 106 shown in FIG. 1. This can also be taken as a block diagram illustrating an exemplary hardware configuration of an information processing apparatus installed in the network environment on the managed (client) side.

This configuration includes: a CPU 302 for performing overall control; a ROM 303, which is a read-only memory for storing a boot program for starting up the system; and a RAM 304, which is an operation memory necessary when the CPU 302 executes a program. The configuration also includes a network interface (I/F) 305 for performing communication over a network, and a display control unit 306 for displaying, in a display device 309, the details of communication and the like carried out with a device monitoring module. At this time, the CPU 302 functions as a communication control means for controlling the network interface (I/F) 305. The configuration further includes input devices 310 and 311 used by the operator who manages the management server 106, and an input control unit 307 which accepts input. In addition, the configuration includes a nonvolatile storage device 308, such as a magnetic disk or the like, that stores a program executed by the CPU 302, operation information of the devices sent from device monitoring modules, and so on.

The management server 106 receives and obtains periodic operating information notifications, non-periodic error status notifications, command obtainment requests, and so on from the device monitoring module via the network I/F 305. The management server 106 also continually accepts, via the input control unit 307, input of commands for changing settings, requesting operations, and so on, made by the user to the device monitoring module 101a or 102a.

The operating information, which is communicated periodically, includes various counter values, operation logs, and so on, and the management server 106 calculates periodic maintenance fees, billed each month to the customers who own the devices, based on this operating information. In addition, the degree to which the parts used in the device have degraded in relation to their recommended lifespan is output in the form of a report. The management server 106 sequentially stores this operating information in the storage device 308. The operator determines the amount to bill the customer by referring to the appropriate operating information stored in the storage device 308.

In addition to operating information, error information such as hardware failures and jams that have arisen and alarm information indicating predicted failures or depleted supplies is included in the information indicating an error status in the device, communicated non-periodically. Upon receiving this information, the management server 106 determines the processing to perform based on the urgency of the information. In the case where the received information is failure information indicating an error status for the device, such as a device failure, that is required to be repaired immediately, an e-mail is sent to the operator who manages that particular device. Furthermore, the fact that the error status has occurred in the device is communicated to the operator by sequentially storing the information in the storage device 308 as well as displaying the information in the display 309. On the other hand, in the case where the received information has low urgency, indicating a jam, an alarm, or the like, the information is stored in the storage device 308, and whether or not it is necessary to perform processing such as sending the e-mail or displaying the information in the display 309 is determined in accordance with the failure. The operator determines the status of the device based on the details displayed in the display 309, and instructs a worker to carry out operations for repairing the failure as necessary.

Command obtainment requests are continually received from the device monitoring module at arbitrary timings. Each time the management server 106 receives a command obtainment request, it checks the details of its own storage device 308, and if a command to be sent to the device monitoring module is set therein, the management server 106 sends that command to the device monitoring module. This command obtainment request is also referred to as an "inquiry command" or an "inquiry request" in that it is a command for the managed device to voluntarily inquire with the managing server 106 as to whether or not the managing server 106 has new information to specify.

Outline of Processing Sequence in the Overall System

Figure 2:
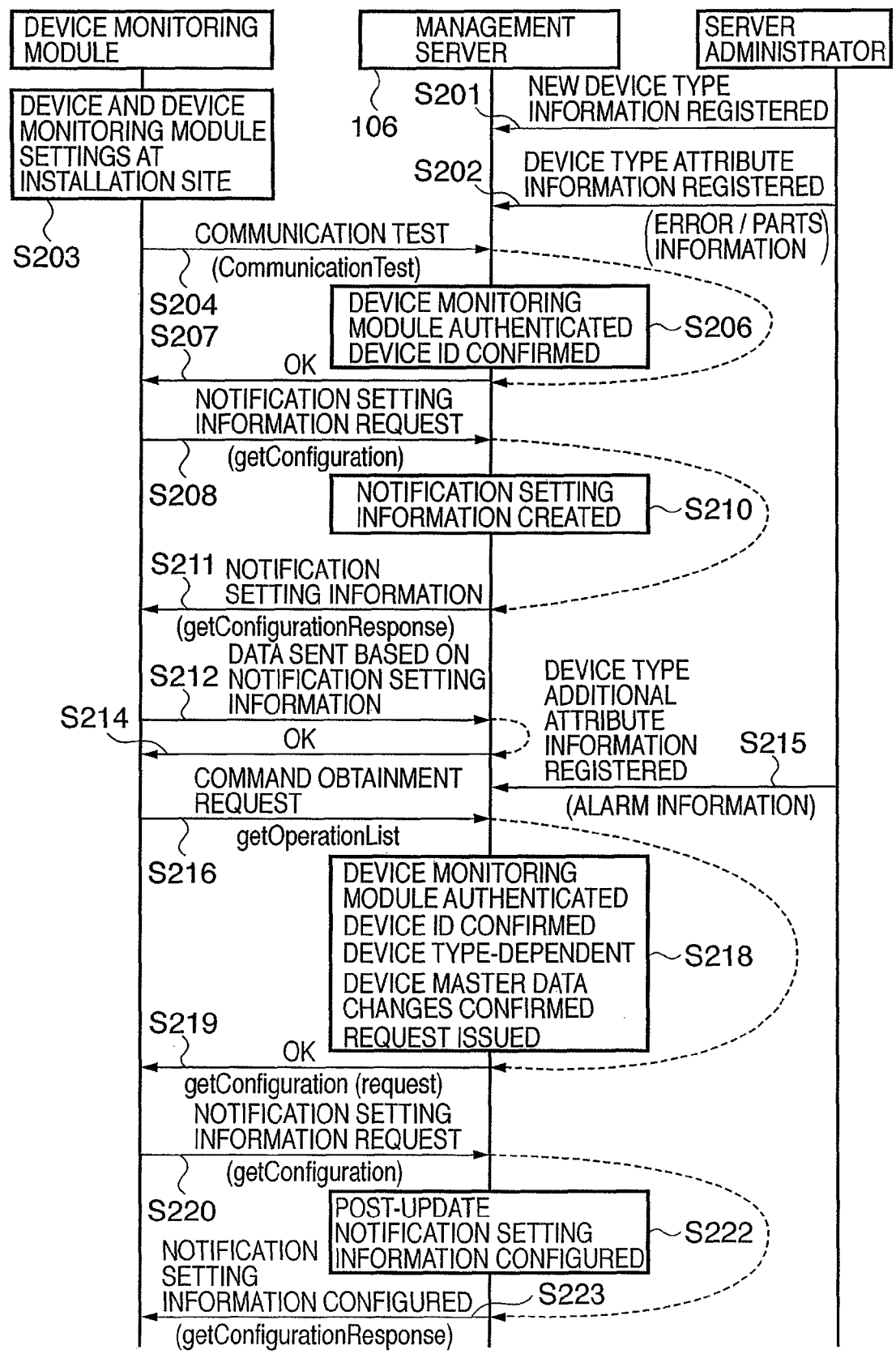
FIG. 2 is a diagram illustrating an example of a sequence of communication carried out between a device monitoring module, a management server 106, and a user, according to an embodiment of the present invention.

FIG. 2 is a diagram showing a partial example of a communication sequence occurring between the device monitoring module 101*a* or 102*a* and the management server 106, according to the present embodiment. Note that FIG. 2 illustrates an example in which a server manager performs the following on the management server 106: "new device type information registration" (S201) for the device; "device type attribute information registration" (S202) for the device; and "device type additional attribute information registration" (S215) for the device. Although this is a description of an outline of the input sequence, the sequence is not limited hereto; there are cases where other information is input. In FIG. 2, the server manager is a person, and inputs/instructs appropriate values to the management server. The management server 106 accepts the inputs/instructions and performs processing in accordance with the sequence.

S201 and S202 indicate that the server manager registers new information regarding a device in the management server 106. In S201, basic information of the new device type introduced to the market, such as the device type name, a device ID, product specifications, product category, and the like, is registered. Information indicating, for example, speed capabilities, functions provided, and so on is included in the product specifications. Information indicating, for example, the category of the product, such as "printer", "copy machine", and so on is included in the product category.

In S202, error information and parts information for the device that is to be newly managed is registered. The error information and parts information (illustrated in detail in FIG. 9) is maintenance information necessary for managing devices of a certain type. The error information includes an error code outputted by devices supported by the management server 106, and, for example, an explanation associated with each error code. The parts information includes, for example, explanation information associated with a code for each part output by the device.

This maintenance information, which corresponds to status codes, is displayed in a display unit in a terminal connected to the management server 106, output as HTML information to terminal apparatuses that access the management server 106 via the Internet, and so on. The information may also be sent and output from the management server 106 as an email to a mobile terminal apparatus held by a worker, via an email server.

It should be noted that plural pieces of maintenance information, such as the error information, parts information, alarm information, jam information, and so on, are necessary for performing maintenance on a single device type (the maintenance information may also be referred to as "device type-dependent device master data" hereinafter). The sequence diagram in FIG. 2 shows that error information and parts information have been registered as the maintenance information; this registration sequence is carried out.

S203 indicates installation operations performed at the installation site in order to commence the device management. These operations are performed by the maintenance worker through, for example, an operational panel on the device.

In S204, a communication test for confirming whether or not the installed device monitoring module is capable of communicating with the management server 106 is carried out. This communication test also serves as an installation confirmation notification, which indicates that the device has been installed as a managed device. For example, a test message is sent as a communication test. Having received this test message, the management server 106 authenticates the device based on a device monitoring module ID included in the test message. The device monitoring module ID is registered in the management server 106 when the device itself is registered in the case where the device monitoring module and the device are integrated, or when the device monitoring apparatus is registered in the case where the device monitoring module is independent. Note that "device monitoring apparatus" refers to an intermediary device, provided with the same functionality as a device monitoring module, that monitors plural image forming apparatuses on the user's side of the network and notifies the management server 106 of the monitoring results.

For example, the authentication can be judged to have been successful if the device monitoring module ID included in the received message matches a pre-registered ID. When authentication is successful, the ID of the monitored device is confirmed. Note that although the following descriptions discuss the device monitoring module ID and the device ID as different entities, a single ID may be used in common. The device ID received during the communication test is searched out from among the device IDs registered in the management server 106. If the ID is found, the device that sent the test message is the monitored device. The management server 106 can obtain detailed information of this device from the device information registered in association with the device ID (equivalent to a device ID 518, referred to later in FIG. 5). Here, communication test completion information indicating that the communication test has been successfully completed is sent to the device monitoring module as an HTTP response. This communication test completion information is expressed as S207.

When the communication test is successfully completed, the device monitoring module sends a notification setting information request to the management server 106, as indicated by S208. This is a request to carry out an inquiry regarding what sort of schedule the device monitoring module is following in sending data to the management server 106, or regarding which event the management server 106 requires data for.

In S210, the management server 106 isolates the device type-dependent device master data registered in association with the device ID included in the notification setting information request. The management server 106 reads out manageable information from that data. To be more specific, it is determined which status code, from among the status codes the device is capable of sending to the management server 106, is associated with the maintenance information. For example, if error information and parts information is included in the device type-dependent device master data as the maintenance information used in maintenance, the management server 106 determines that the corresponding status codes are to be monitored. Then, the notification setting information, through which the device communicates these status codes, is created. It should be noted that in actuality, the device ID may be directly associated with the device type-dependent device master data, or the device ID may be associated with the device type information and that device type information may then be associated with the device type-dependent device master data.

However, status code information in which corresponding maintenance information is not registered cannot be used in maintenance, and thus is discarded when received. Accordingly, when error information and parts information have been registered, the management server 106 creates the notification setting information in which this error information and parts information, in addition to billing counter information that is the basic data, are written as status codes to be sent by the corresponding device monitoring module. The management server 106 also creates a schedule (timing) at which the status codes sent by the device monitoring module are to be sent to the management server, and writes this schedule in the notification setting information. The management server 106 further includes, in the schedule within the notification setting information, a schedule of command obtainment requests for providing opportunities for the device monitoring module to perform information requests to the management server 106. Through these command obtainment requests, the management server 106 can issue instructions to the device monitoring module even in an environment in which the firewall 105 is present and thus the management server 106 cannot voluntarily issue instructions to the device monitoring module.

In S211, the notification setting information created in S210 (for example, FIG. 7, mentioned later), is sent to the device monitoring module as an HTTP response to the notification setting information request issued in S208.

S212 and S214 indicate that the device monitoring module has entered a normal state of management and is communicating normally. In S212, the device monitoring module sends the specified status codes in accordance with the notification setting information received from the management server 106. For example, it is assumed that in FIG. 2, error information is included in the status codes, and the notification schedule thereof immediately follows the detection. Here, in the case where an error occurs in the monitored device and the device monitoring module detects the error, it immediately sends error information to the management server 106.

The status code that the device monitoring module is to send can also be added here. For example, it is assumed that when the device type information was registered in S201, the management server 106 could not process the status code "alarm" for the device. It is also assumed that after this, maintenance information corresponding to the alarm code is registered through, for example, updating the version of the management server 106, and thus the alarm can be dealt with. Here, in S215, the server manager registers the alarm information, which is additional maintenance information, as device type-dependent device master data for the corresponding device in the management server 106. Accordingly, the information that can be managed for devices of the corresponding device type increases in the management server 106. The device installed first has been configured so that it does not send alarm information, and thus no alarm information is sent therefrom to the management server 106.

Next, the management server 106 waits for a command obtainment request, which is a part of normal sending, to be sent from the device monitoring module. The command obtainment request is sent by the device monitoring module to the management server 106 in accordance with the schedule set in the notification setting information. For example, the command obtainment request is communicated periodically. S216 indicates that the device monitoring module sends the command obtainment request to the management server 106 in accordance with the set schedule of communication.

In S218, the management server 106, which has received the command obtainment request as an inquiry command, authenticates the device monitoring module and confirms the device ID. This is identical to S206. After this, it is determined, with reference to the device type-dependent device master data, whether or not the details thereof have been changed, as well as whether or not there is a request to be issued to the device monitoring module, in regards to the stated device ID. For example, when a manager changes the details, an update flag indicating that the changed items have been updated is set, and that update flag is reset when the device is notified thereof; the determination mentioned here can be implemented through an operation such as this. The update flag stated here corresponds to 1119 shown in FIG. 10, which shall be mentioned later.

In the present example, the notification setting information of the device type-dependent device master data is determined to have been updated. Through this, it can be seen that it is necessary to once again reconfigure the notification setting information for the device monitoring module of the stated device. Accordingly, in S219, the management server 106 sends a request (also called a "communication request") prompting the issuance of the notification setting information request to the device monitoring module. Note that the specific type of request to be issued from the management server 106 to the device monitoring module in S219 is appropriately updated each time through the details in the database. In FIG. 2, getConfiguration(request) is shown. Having received the command issuance request, the device monitoring module sends the notification setting information request to the management server 106 in S220.

Having received the notification setting information request, the management server 106 reads the device type-dependent device master data of the corresponding device in S222. Then, the management server 106 performs basic schedule settings, as well as settings for information to be sent with respect to the device monitoring module, so that error, parts, and alarm information are sent by the corresponding device (S223).

<Software Configuration Example of Management Server 106>

Figure 4:
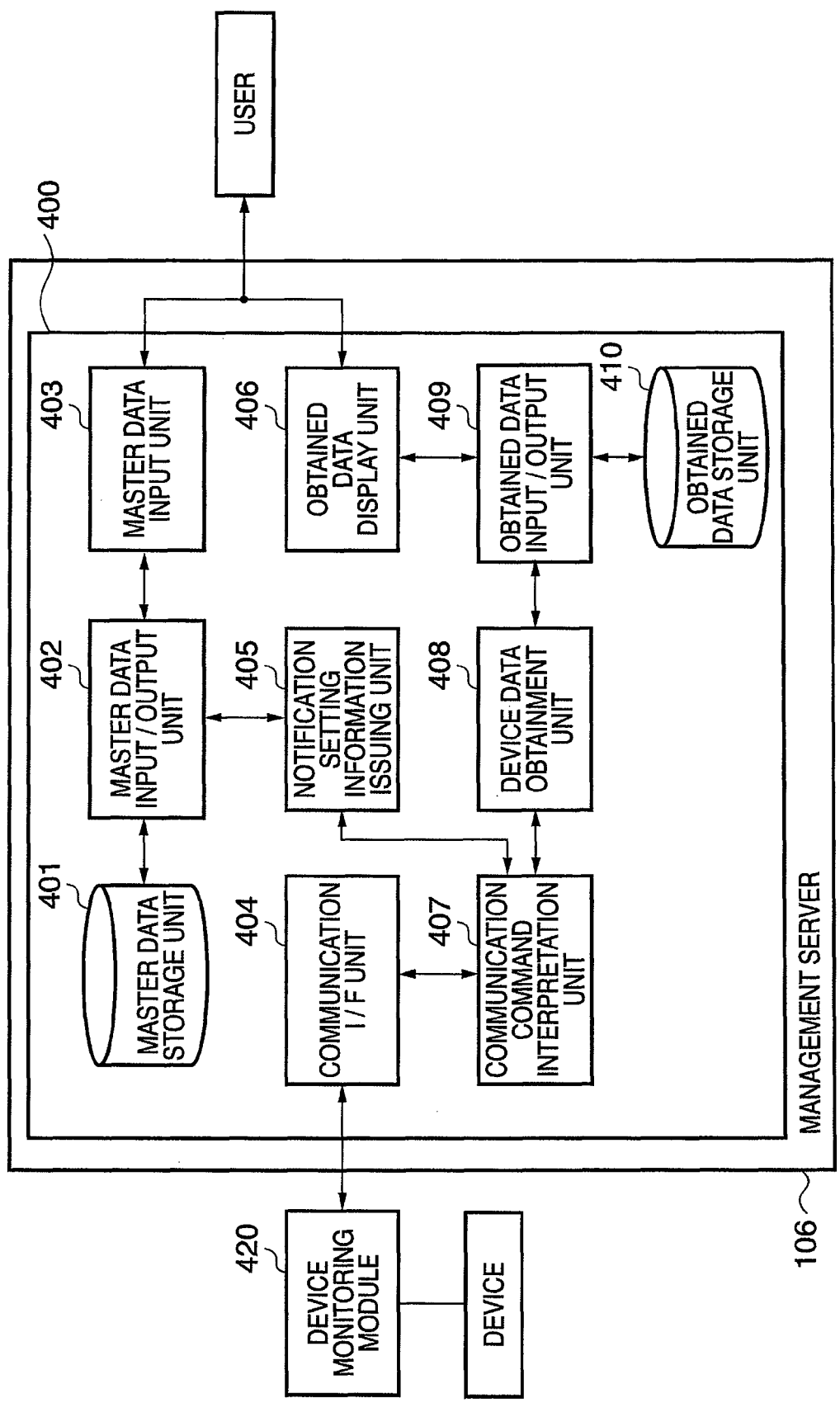
FIG. 4 is a function block diagram of an application program of a management server 106 according to an embodiment of the present invention.

FIG. 4 is a block diagram illustrating functions of an application program 400 installed in the management server 106 that creates and issues appropriate notification setting information to a device monitoring module.

The application program 400 has a master data input unit 403 that accepts input of master data from a user. Two types of master data exist. On type is device type-dependent device master data, which is dependent on the type of the device. The device type-dependent device master data includes information of the basic type of the device, such as, for example, the product name and product specifications of the device, and includes code information such as errors and alarms that are dependent on the device type. The second type of master data is monitored device master data, which is information unique to the monitored device, such as customer information such as the device ID and installation location of the monitored device. The application issues the notification setting information with reference to these two types of master data (explained in detail later with reference to FIG. 13). Furthermore, input of the master data is implemented by, for example, loading profile data provided by the manufacturer of the device, or by the user manually inputting the data.

The application program 400 also includes a master data input/output unit 402 for storing the input master data in a master data storage unit 401.

Furthermore, the application program 400 also includes a communication I/F unit 404 and a communication command interpretation unit 407 used for communication with a device monitoring module 420. The communication command interpretation unit 407 extracts an identification ID, a communication command, or the like of the device monitoring module 420 from the data received from the device monitoring module 420. Moreover, the communication command interpretation unit 407 generates data in accordance with a communication format, to be sent to the device monitoring module 420.

The application program 400 also includes a notification setting information issuing unit 405. When it is necessary to send new notification setting information to the device monitoring module 420, or when a sending schedule has been requested, the notification setting information issuing unit 405 creates notification setting information pertinent to the corresponding device monitoring module 420. The notification setting information issuing unit 405 calls the device type-dependent device master data and monitored device master data from the master data input/output unit 402 and determines sending settings appropriate for the device monitoring module 420.

The application program 400 further includes a device data obtainment unit 408, an obtained data input/output unit 409, an obtained data storage unit 410, and an obtained data display unit 406. The device data obtainment unit 408 accepts device status data received from the device monitoring module 420 in a normal monitoring state from the communication command interpretation unit 407. The obtained data storage unit 410 stores the device status data obtained by the device data obtainment unit 408. The obtained data input/output unit 409 manages processing for inputting/outputting items to/from the obtained data storage unit 410. The obtained data display unit 406 displays the status data obtained from a device to the user.

<Data and Program According to Present Embodiment>

The following is a detailed description of programs and data processed by the management server 106 and a device. Descriptions shall first be provided regarding an overall outline of the database in the management server 106 as well as the programs and data processed by the management server 106 with reference to FIGS. 5 and 6, in the following sections <1. Example of Overall Database of Management Server 106> and <2. Example of Programs and Data Processed by Management Server 106>. Descriptions shall also be provided regarding a programs and data processed by a device with reference to FIG. 12, in the following section <7. Example of Programs and Data Processed by Device>. Furthermore, descriptions shall be provided regarding information sent from the management server 106 to the device with reference to FIGS. 7 and 8, in the following sections <3. Notification setting information Sent from Management Server 106 to Device> and <4. Response Information from Management Server 106>. Finally, the details of the database in the management server 106 as described in the section <1. Example of Overall Database of Management Server 106> shall be described with reference to FIGS. 9 and 10.

<1. Example of Overall Database of Management Server 106>

FIG. 5 is a diagram illustrating an example of a configuration of programs and data stored in a non-volatile state in the ROM 303 or storage device 308 shown in FIG. 3. Note that only programs and data of significant relation to the present embodiment are shown in FIG. 5; others have been omitted. However, because the master data shown in FIG. 5 is updated, it is necessary to use a rewritable ROM if the data is to be stored in a ROM.

A system program 501 indicated in FIG. 5 is a program that carries out basic control of the device, and is an OS or the like. A device management program 502 controls the overall device management performed by the management server 106. The parts of this device management program 502 related to the present embodiment shall be described below with reference to FIGS. 13, 14, 15, and 16. A user interface program 503 controls input of master data performed by the user, outputting a display of the device status, and so on. The user interface program 503 stores the master data input by the user in a predetermined database. A user/management device authentication program 504 authenticates the user who inputs the master data or the device monitoring module that sends device status data.

A message sending/receiving program 505 controls the sending/receiving of messages including commands sent between device monitoring modules and the management server 106 via the Internet 110. A received command analysis program 506 analyzes commands included in messages received from the device monitoring module 420 and instructs the execution of processing corresponding to the commands. Processing programs 507 are executed in accordance with the results of the analysis performed by the received command analysis program 506. For example, if, as a result of the analysis, the received command is found to be a command obtainment request, a request sending processing program 508 is executed. However, if, as a result of the analysis, the command is found to be reception of notification setting information, a notification setting information sending processing program 509 is executed. Alternatively, if, as a result of the analysis, the command is found to be reception of the status of a device, a status reception processing program 510 is executed. Here, the received commands shown are related to the present embodiment, but the commands are not limited hereto.

A device type-dependent database (abbr. "device type-dependent DB" hereinafter) 511 is a database of device type-dependent device master data stored in the management server 106. Device type-dependent master data is registered in the device type-dependent DB 511. For example, in the present embodiment, device type information, such as device type basic information 512 indicating the product name, specifications, and so on of the device, device type-dependent error information 513 indicating error information per device type, and so on, is registered. Furthermore, device type-dependent alarm information 514, which indicates alarm information by device type, as well as device type-dependent jam information 515, device type-dependent parts information 516, and so on, are registered as well.

A monitored device database (abbr. "monitored device DB" hereinafter) 517 is a database of monitored device master data stored in the management server 106. A device ID 518, which serves as an identifier of the monitored device in the present embodiment, device type information 519 of the monitored device, and so on are included in the monitored device DB 517. The management server 106 can use the device type information 519 to isolate the association between a device and its corresponding device type-dependent device master data. In addition, a monitoring activity flag 520, through which monitoring of items that have been registered in the database can be cancelled, sending setting information 521 in which is saved notification setting information for devices to be monitored, and so on, are included as well.

<2. Example of Program and Data Processed by Management Server 106>

Figure 6:
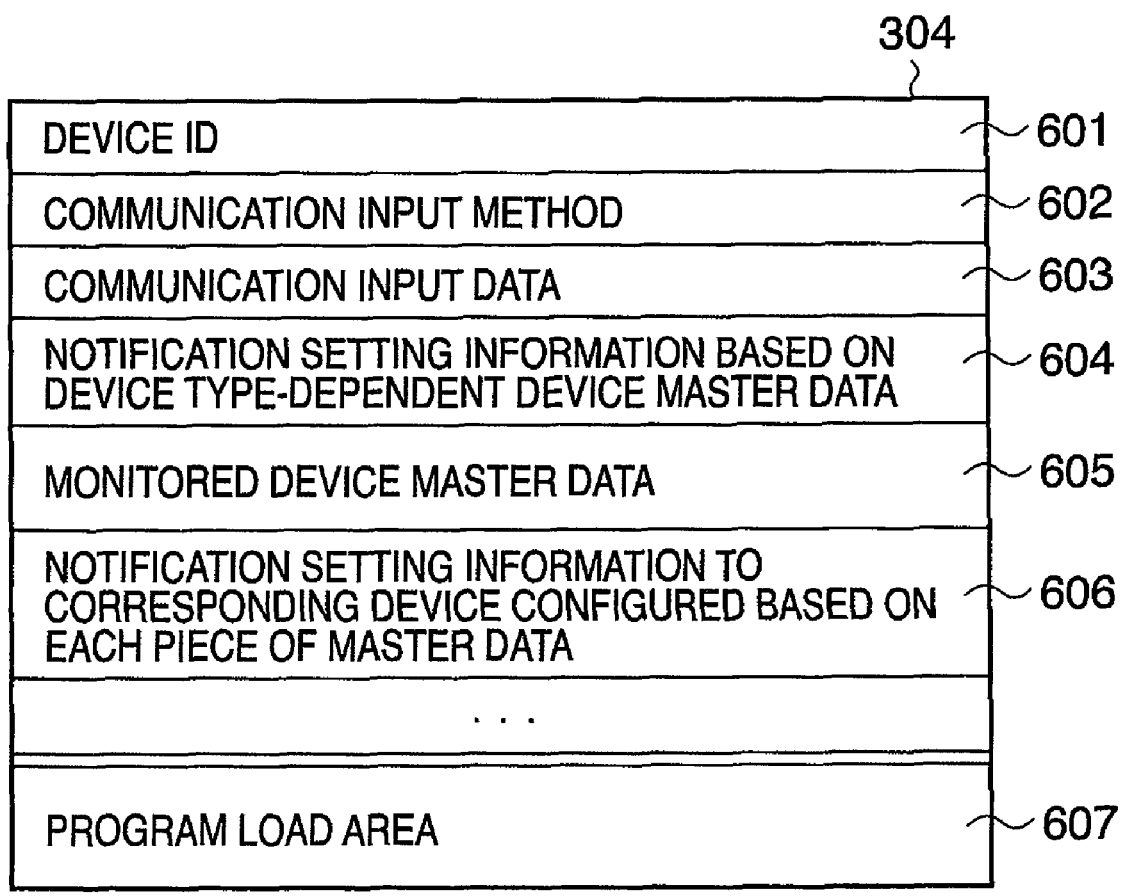
FIG. 6 is a diagram illustrating another example of a storage configuration of a management server 106 according to an embodiment of the present invention.

FIG. 6 is a diagram illustrating an example of the configuration of data temporarily stored in the RAM 304 shown in FIG. 3. Note that only programs and data of significant relation to the present embodiment are shown in FIG. 6 as well; others have been omitted.

A device ID 601 is an ID of a device sent from the device monitoring module 420. A communication input method 602 indicates an input method sent by the device monitoring module 420. The input method is, for example, expressed by a code. The notification setting information request (S208) and command obtainment request (S216) in FIG. 2 are examples of input methods. Communication input data 603 is input data sent from the device monitoring module. For example, if the input method is a code indicating a counter input, the received counter number and counter value are stored in the input data area. An example of this is indicated by the data sent in the data sending (S211) in the example shown in FIG. 2.

The device type-dependent device master data (maintenance information) associated with the monitored device is extracted from the device type-dependent DB 511 and saved in notification setting information 604. The monitored device master data associated with the monitored device is extracted from the monitored device DB 517 and saved in 605. Upon receiving a notification setting information request from the device monitoring module 420, the application program 400 refers to the databases 511 and 517 for the respective corresponding pieces of master data.

Next, the application program 400 determines and creates notification setting information appropriate for the device monitoring module that is the origin of the notification setting information request. The notification setting information created here is output to a notification setting information area 606. The information outputted here is illustrated in FIG. 7. The notification setting information is output to the notification setting information area 606 when the flag 1119 indicates an update.

A program load area 607 is a storage area for loading the program illustrated in FIG. 3, used for the CPU 302 to execute the program.

<3. Notification setting information Sent from Management Server 106 to Device Side>

FIG. 7 is a diagram schematically illustrating the notification setting information sent from the management server 106 to the device monitoring module 420. In FIG. 7, notification setting information 702 is a response to a notification setting information request received by the management server 106. The notification setting information 702 is a response to the notification setting information requests received in S208 and S220 shown in FIG. 2.

Header information of the notification setting information is included in the notification setting information 702. In addition to this, the following information, such as information indicating the data type, information indicating the data belonging to each data type (data ID), sending settings regarding each piece of data (ON or OFF), schedule communication periods, and so on are included in the notification setting information 702.

As one specific example, event type data 703 is data that indicates an event type. Here, for example, a code for a predetermined value is assigned. "Event type" refers to data that is to be sent immediately when the corresponding event occurs. Following this, the data details (data ID) and sending settings are included as well. In FIG. 7, a device type-dependent error code 704 is included as the data of the event type. A sending setting indicating whether to send (ON) or not to send (OFF) the device type-dependent error code 704 from the device monitoring module to the management server are included in a sending setting 705. In FIG. 7, the value of the sending setting 705 is ON. The data 703, 704, and 705 serve to instruct the device monitoring module 420 to send information to the management server immediately in the case where an error has occurred in the monitored device. Moreover, data 706, 707, and 708 indicate that information is not to be sent to the management server even in the case where an alarm occurs in the monitored device. Data 709, 710, and 711 indicates that information is to be sent to the management server immediately after the event of "jamming" occurs, in the case where a jam has occurred in the monitored device.

A schedule type data 715 is data indicating a schedule type. A data ID of "print counter data" 716 is present as the data ID of the schedule type in data ID, which follows the schedule type data 715. A value of "ON" is present as the sending setting in sending setting 717. The schedule type further includes the sending schedule. Sending start time 718 includes a standard sending start time used when performing schedule communication. Sending interval 719 includes a sending interval time used when performing schedule communication. Data 715, 716, 717, 718, and 719 specify that print counter data of the monitored device will be sent starting at the specified sending time and for the specified interval through schedule communication. Data 720, 721, 722, 723, and 724 specify that setting information of the monitored device will be sent starting at the specified sending time and for the specified interval through schedule communication. Data 725, 726, 727, 728, and 729 specify that the device monitoring module 420 itself is to perform a command obtainment request to the management server 106. The sending start time and sending interval are also specified, in the same manner as the other instances of communication.

<4. Response Information from Management Server 106>

Figure 8:
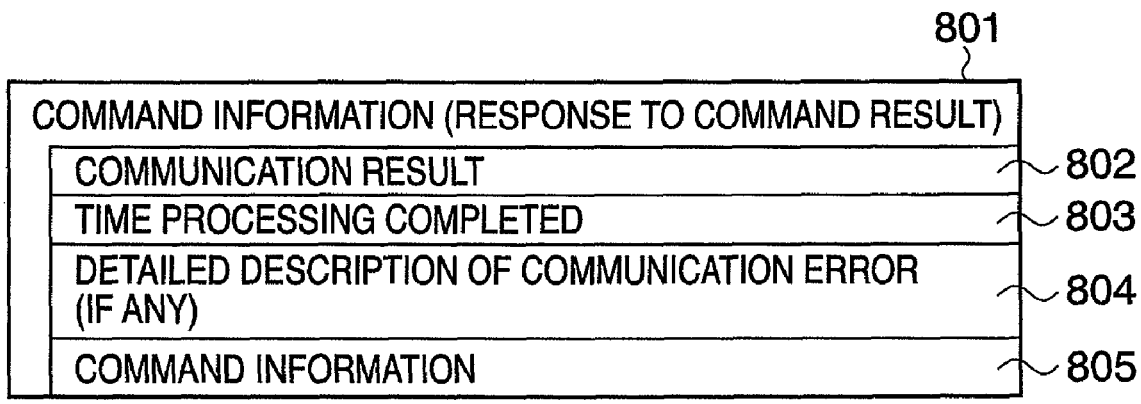
FIG. 8 is a diagram illustrating an example of a request input to a managed device by a user via a management server 106, according to an embodiment of the present invention.

FIG. 8 illustrates a response made by the management server 106 to the device side, in response to a command obtainment request that the management server 106 received from the device monitoring module. A response 801 includes code indicating that it is a response. The response 801 corresponds to S219 in FIG. 2.

Field 802 is code indicating a communication result. The result indicates whether the management server 106 succeeded or failed in receiving the command obtainment request, in response to S216. Field 803 is the time at which processing completed. Field 804 is a detailed description of the reception failure. Field 805 is command information (this is equivalent to, for example, the getConfiguration(request) shown in FIG. 2). This is output in the case where there is a command that is to be specified to the monitored device.

<5. Example of the Device Type-dependent Device Master Data>

FIG. 9 illustrates details of the device type-dependent device master data DB 511 illustrated in FIG. 5.

The device type-dependent database 901 in FIG. 9 represents a part of a device type-dependent database, and device type information regarding a product, Product A, is stored therein. Device type basic information 902 holds the device type information of Product A as well as information regarding the corresponding specifications. The information regarding specifications includes basic spec information regarding the product, such as, for example, class information of the device, how many pages can be printed in one minute, whether it is a color printer, whether it is a black and white printer, and so on. Toner information 903 is information regarding the toner that can be used by the device in question. If the device is a color printer, toner product information 904, 905, 906, and 907, for each color, are held therein. Here, toner attribute information such as recommended maximum number of sheets is stored in addition to the product name information.

Error information 908 stores information regarding error codes included in Product A. An error code and a description/response method for that error code are stored in association with one another in fields 909 and 910 respectively. Information regarding alarm codes included in Product A is stored in field 911. An alarm code and a description/response method for that alarm code are associated with one another in fields 912 and 913 respectively. Information regarding jam codes included in Product A is held in a field 914. A jam code and information such as a description of the jam code/what part of the product the jam has occurred in are associated with one another in fields 915 and 916 respectively. A part code and information such as a description of the part code/the name of the part/the recommended lifespan of the part and so on are associated with one another in fields 917, 918, and 919, respectively. Finally, information such as when the device type-dependent master data was created, when it was updated, and so on is stored in fields 920 and 921 respectively.

<6. Example of the Monitored Device Master Data>

FIG. 10 illustrates details of the monitored device master data DB 517 illustrated in FIG. 5.

The monitored device database 1101 in FIG. 10 represents a part of the monitored device master data, and stores device information regarding a monitored device A. The device ID of the monitored device A is stored in a field 1102. The management server 106 can determine which device a certain piece of device information is from by using information of the device sent by the device monitoring module and this device ID. Product (device type) information of the monitored device A is stored in field 1103. This product information is associated with the device type-dependent device master data shown in FIG. 9, and attribute information of the monitored device, such as error information and alarm information, can be utilized through this product information.

Field 1104 indicates a flag that can be set so that monitoring of the device is active or inactive. For example, in the case where the device is to be temporarily removed from monitoring by the management server 106, this flag can be set to OFF, which removes the device from monitoring. Furthermore, when, for example, the monitoring activity flag 1104 is changed from "active" to "inactive", data regarding the device does not need to be sent from the device monitoring module. In response to this, the application program 400 of the management server 106 changes the sending settings for all device information to OFF. However, because there is still the possibility of the monitoring activity flag being changed from "inactive" to "active", the command obtainment request still needs to be scheduled.

Field 1105 is the storage location of the current notification setting information regarding the monitored device. In addition to this, the storage location of which firmware version is installed in the monitored device is also included.

Field 1106 stores customer information of the monitored device. A customer name, manager name, and installation location are stored in fields 1107, 1108, and 1109, respectively, thereby making it possible to quickly notify a system user of which customer owns the device in question, even in the case where a serious error occurs in the device. Field 1110 holds network information of the monitored device. Fields 1111, 1112, and 1113 respectively store a device name, IP address, MAC address, or the like of the monitored device. Field 1114 holds information of the administrator of the customer's monitored device (administrator information). Fields 1115 and 1116 hold the name and e-mail address of the administrator that manages the status of the device itself on the customer side. Furthermore, fields 1117 and 1118 hold the name and e-mail address of the administrator that manages device supplies that can be depleted, such as toner, on the customer side.

Field 1119 holds flag information indicating whether the information that causes changes in the schedule communication, based on both the device type-dependent master data and the monitored device master data, has been updated. The setting value update flag in 1119 is set to indicate an update in the case where either or both of the device type-dependent master data and the monitored device master data have been updated.

In this manner, when the status information of the device changes, the information necessary to the management server 106 also changes. Accordingly, a schedule change request is made to the device monitoring module; when the request is necessary, this setting value update flag is set. Fields 1120 and 1121 hold the date/time when this table was first created, the date/time of the latest update, and so on.

<Block Diagram of Hardware Configuration of Device>

Figure 11:
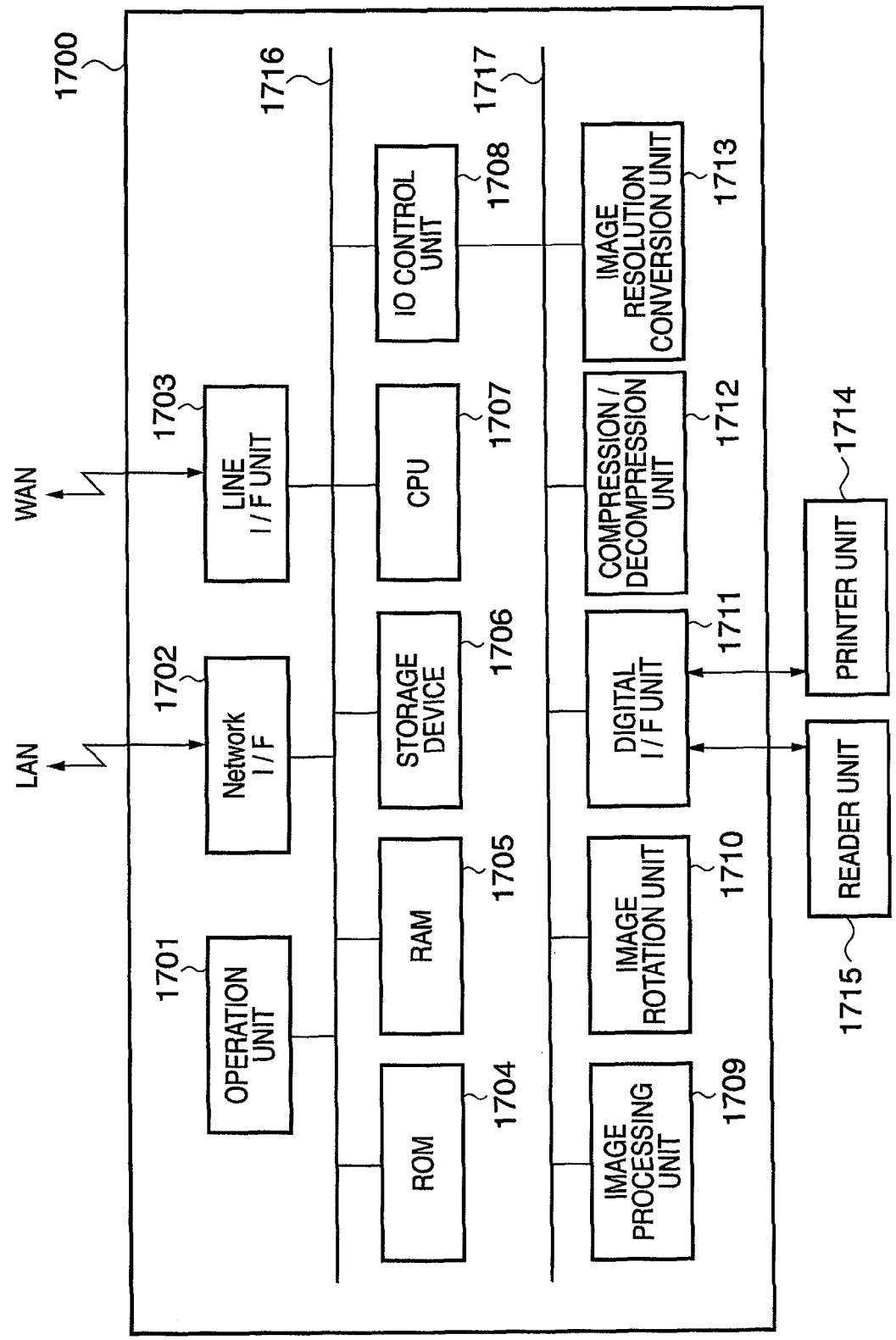
FIG. 11 is a block diagram illustrating an example of a hardware configuration of a device, according to an embodiment of the present invention.

FIG. 11 is a block diagram of a control unit in the device. This represents an example where the device monitoring module performs processing within the device. The device monitoring module is processed within a control unit 1700 in the device, and carries out processes such as managing the individual information of the device, sending status information of the device to the management server, and so on. The control unit 1700 of the device primarily carries out control processes for programs, such as printing and scanning, and also controls various applications such as the device monitoring module.

The various constituent elements of the control unit 1700 are connected to a system bus 1716 and an image bus 1717. A control program for the device and the device monitoring program are stored in a ROM 1704 and are executed by a CPU 1707. A RAM 1705 is an operational memory area used for executing programs, and also serves as an image memory for temporarily storing status information of the device necessary when the device monitoring program carries out monitoring, image data, and so on. A storage device 1706 is a non-volatile storage device, and stores information required to be retained even after the copy machine 101 is restarted, such as various operational mode settings, counter values, operation logs, and so on. A network I/F 1702 is an interface unit for making a connection with a LAN, and carries out communication with the management server via the LAN. A line I/F 1703 is connected to ISDN, a public telephone network, or the like, is controlled by a communication control program within the ROM 1704, and exchanges data with a remote terminal via an ISDN I/F, a modem, or an NCU (network control unit). Facsimile exchanges are also performed using this line I/F 1703. A display means, a key input means, and the like are included in an operation unit 1701; these are controlled by the CPU 1707. An operator carries out various setting instructions regarding scanning, printout, and the like, as well as instructions to commence and stop operations, through the key input means.

The abovementioned devices are disposed along the system bus 1716. An IO control unit 1708 is a bus bridge for connecting the system bus 1716 with the image bus 1717, which transfers image data at high speeds. The image bus 1717 is implemented through a PCI bus or IEEE 1394. The following devices are disposed along the image bus 1717. A digital I/F unit 1711 connects a reader unit 1715, a printer unit 1714, and the like of the device to the control unit, and performs conversion between a synchronous system and an asynchronous system on the image data. Furthermore, information from various types of sensors disposed in various locations within the reader unit 1715, printer unit 1714, and so on travel to the system bus 1716 via the digital I/F unit 1711 and the IO control unit 1708. An image processing unit 1709 corrects/processes/edits input and output image data. An image rotation unit 1710 rotates image data. An image compression/decompression unit 1712 compresses/decompresses multi-valued image data according to the JPEG format and binary image data according to the JBIG/MMR/MR/MH formats. An image resolution conversion unit 1713 converts the resolution of image data to be output.

The CPU 1707 reads out operating information and failure information such as counter values, operation logs, and so on stored in the storage device 1706, and sends this information to the management server 106 via the network I/F 1702 as the status information of the device, through the control program executed by the CPU 1707 itself.

<7. Example of Program and Data Processed by Device>

FIG. 12 is a diagram illustrating an example of the configuration of a program and data stored in a non-volatile state in the ROM 1704 or storage device 1706 shown in FIG. 11. Note that in FIG. 12, only programs and data of significant relation to the present embodiment are shown; others have been omitted.

A system program 1801 is a program that performs basic control of the device, such as an OS. A device management program 1802 controls the management of the device. A message sending/receiving program 1803 controls sending/receiving so as to receive setting specifications and so on from the management server 106 or send status information of the device, command obtainment requests, and so on to the management server 106.

A received command analysis program 1804 analyzes commands received through communication from the management server 106 and determines what action to take based on those commands. In the case where the received command is notification setting information, a notification setting information analysis program 1805 determines what type of data to send to the management server 106 through what schedule, or whether or not to send data at all.

A various processing program 1806 is executed in accordance with the results of the analysis performed by the notification setting information analysis program 1805. For example, in the case where an event has occurred in the device, an event information sending processing program 1807 determines the timing at which to send event data to the management server 106 and executes an event information sending processing at the determined timing. As an example of this timing, a message indicating the occurrence of the event is sent to the management server 106 within a predetermined timespan following the occurrence of the event (for example, immediately after the event). A schedule information sending processing program 1808 sends a message, whereas a counter information sending processing program 1809 sends counter information. A schedule setting change processing program 1810 updates the notification setting information managed by the device monitoring module to the latest notification setting information received from the management server 106.

A device ID 1811 indicates a device ID for identifying the device within the management server 106. Furthermore, a device status DB 1812, which holds information regarding the status of the device, is managed within the storage device. Device basic information 1813 of the device, such as the firmware and type of the device, is stored in this database. In addition to this, event information regarding events occurring up until the present time, such as error information 1814, alarm information 1815, and jam information 1816, as well as the degree of degradation 1817 of parts (parts information), is also stored herein. Also, from among the values indicating the status of the device, counter types in particular, such as a billing counter 1819, a function counter 1820, and so on, are stored in a counter data DB 1818 of the device. A program load area 1821 is a storage area into which the program shown in FIG. 17 (mentioned later) is loaded for execution by the CPU 1707. Note that the error information, alarm information, jam information, and parts information shown in FIG. 12 indicate a history or temporarily-stored information regarding errors, alarms, jams, and parts degradation. These are different from the information thereof stored in the management server 106 as maintenance information.

Note that in FIG. 11, the device monitoring module is installed in the device, and thus the device ID serves as an ID of the device monitoring module as well. However, in the case where these are different entities, a unique ID for the device monitoring module is prepared in the database so that the device monitoring module can be authenticated by the management server.

<Explanation of Flowcharts>

Hereinafter, the main flowchart regarding monitoring of the device by the management server 106 according to the present embodiment shall be explained using FIG. 13; after this, details of each of the steps in the main flowchart shall be described using FIGS. 14 to 17.

<Example of Device Monitoring Operation Performed by Management Server 106 in Present Embodiment>

An example of operations performed by the management server 106 when monitoring a device according to the present embodiment shall be explained assuming the configuration described above. Note that the following explanation of the example of operations is provided assuming that a single device monitoring module monitors the device, for the purpose of simplifying the process. However, in actuality, there are also situations where plural device monitoring modules monitor the device. In such a case, the processes explained hereinafter are required to be executed for each of the device monitoring modules.

The present example of operations illustrates a situation where the management server 106 acknowledges the communication method when there is some sort of communication from the device monitoring module, and the sending settings are specified so that the information to be sent from the device monitoring module 420 is sufficient in terms of the information required by the management server 106.

Figure 13:
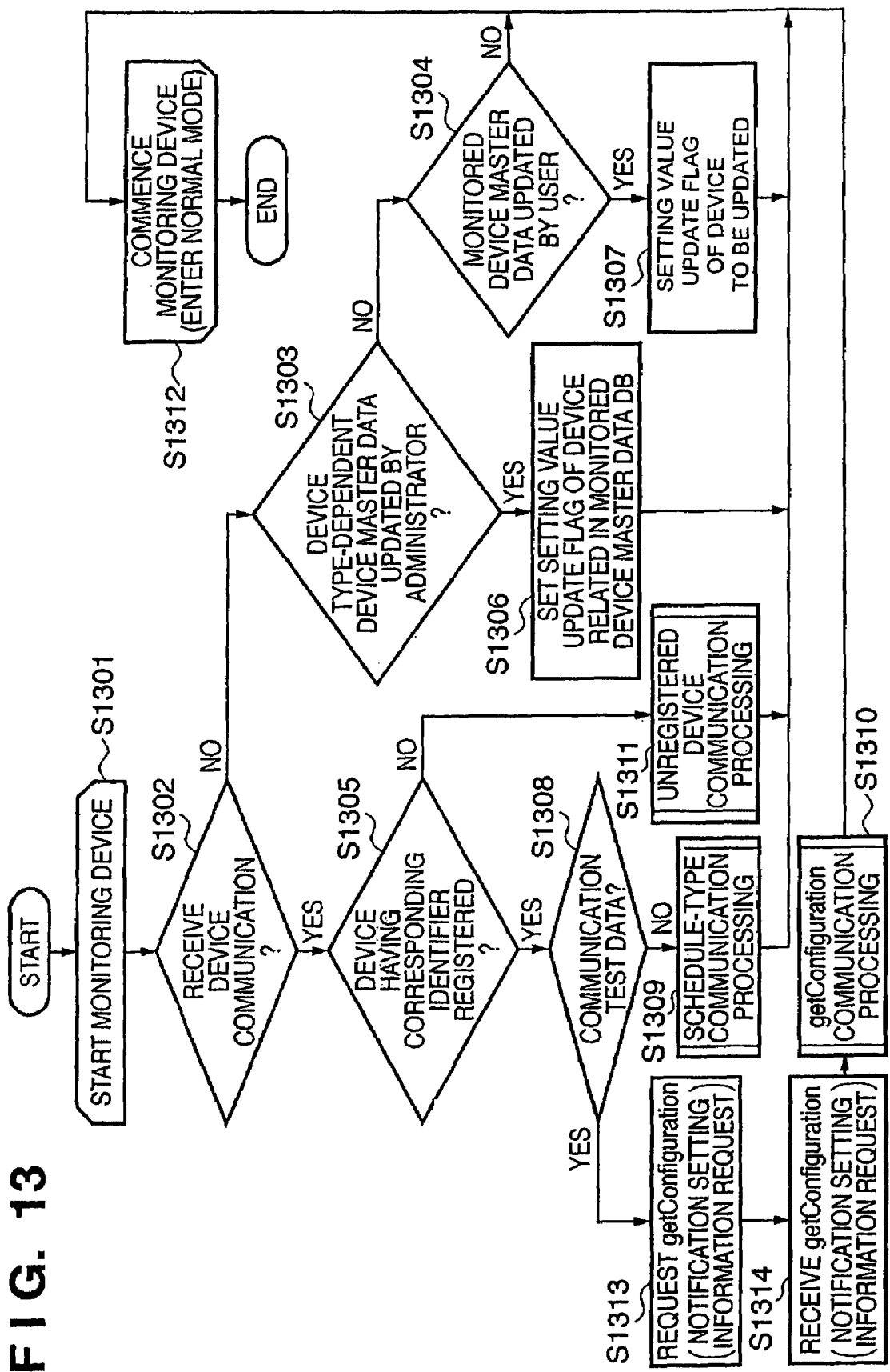
FIG. 13 is a flowchart illustrating an overall flow of operations when a management server 106 returns a data sending schedule to a device, according to an embodiment of the present invention.

FIG. 13 is a flowchart regarding the actions performed when the management server 106 receives a request from a device while in device monitoring mode. Here, "device monitoring mode" is intended to include the entire process of monitoring data input from the exterior as indicated by S201 to S223 in FIG. 2. Furthermore, FIG. 13 indicates processing regarding actions taken when the management server 106 receives an update of the device type-dependent device master data from an administrator and when the management server 106 receives a request to register a monitored device from a user. Note that a "request" is a request message sent to the management server 106 by a device monitoring module, and includes data sending in accordance with a communication test, notification setting information, and so on.

The example of operations shown in this flowchart has a characteristic whereby the management server 106 automatically determines communication settings appropriate for the device monitoring module based on the setting values in the database within the management server 106 itself, and sends the setting information.

In addition, in this example of operations, the device monitoring module is assumed to be included within the device, and the management server 106 is assumed to communicate with the device.

First, S1301 indicates a loop, or the internal processing of the management server 106, commencing. The management server 106 enters device monitoring mode thereby. In S1302, the management server 106 determines whether it has received communication from the device via the network I/F. Here, S204, S208, S212, S216, S220, and so on can be considered as communication from the device. In the case where there has been communication from the device, the procedure moves to S1305, where it is determined whether or not the device, or communication partner, matches a device ID registered in the management server 106. A device identifier (the device ID) is included in the various requests from the device. Specifically, the device identifier included in each of the various requests is searched for within the DB in the management server 106, and it is determined whether or not that device identifier is registered in the DB in the management server 106. It should be noted that the device monitoring module ID may be used in place of the device identifier, which is what is searched for the determination in S1302; however, the following explanations shall be given assuming that the device ID is used as the device identifier.

In S1302, in the case where the management server 106 has not received communication from the device, the procedure moves to S1303, where it is determined whether or not the device type-dependent database 511 has been updated in response to operations performed by an administrator. In the case where there has been an update in the device type-dependent database 511 in S1303, the procedure moves to S1306, where the management server 106 extracts the master data of the device related to the updated device type from the monitored device database 517. For example, the monitored device master data including the device type information 1103 that matches with the device type basic information 902 included in the updated device type-dependent master data is extracted as the master data of the related device. The setting value update flag 1119 of the extracted monitored device master data is then set.

In the case where the device type-dependent database 511 has been updated, the devices related to the updated device type are affected in terms of the content of the communication they perform. For this reason, the setting value update flag 1119 (see FIG. 10) of the device in question is set. For example, in the case where alarm information of a certain device type has been added, the alarm information for the corresponding device type can be controlled by the management server 106 thereafter. Accordingly, it is necessary to update the notification setting information of the device so that the alarm information is sent from the device to the management server 106. Here, because the management server 106 cannot subjectively update the notification setting information of the device, the management server 106 waits for communication from the device, and executes the update upon receiving communication from the device. Accordingly, in S1306, the setting value update flag is set in order to record the fact that the device type-dependent database has been updated in the database.

When this process ends, the procedure moves to S1312, and returns to the first step of the loop, or S1301. In S1303, in the case where the device type-dependent master data has not been updated by an administrator, the procedure moves to S1304. In S1304, the management server 106 determines whether the monitored device database has been updated by a user. If, in S1304, the management server 106 has determined that the monitored device database has been updated by a user, the procedure moves to S1307. In the case where the update of the monitored device database is an update that requires the notification setting information to be updated as well, the setting value update flag 1119 of the monitored device is set, and in the management server 106 stands by for the communication from the device in question.

If, in S1304, it is determined that there has been no update from the user, the procedure moves to S1312, and returns to the beginning of the monitoring mode loop. After the setting value update flag has been set in S1307, the procedure moves to S1312, and returns to the beginning of the monitoring mode loop.

In S1305, it is determined whether the identifier (device ID) of the device that sent the request is registered in the monitored device database managed by the management server 106. Here, in the case where the device ID is not registered, the procedure moves to S1311, where communication processing for unregistered devices is performed. Devices are typically installed at the customer's site and communicate with the management server 106 after being registered in the management server 106 as monitored devices prior to installation. However, there is no guarantee that this order of operations will be followed, and hence there are cases where the device is installed and the device carries out communication prior to being registered. In a case such as this, the setting processing on the customer side may be terminated, and management may be commenced upon the registration being carried out. A process such as that described in S1311 is performed as the actual management system processing. The communication processing performed by the unregistered device shall be illustrated in FIG. 15.

In S1305, if the identifier of the device that issued the request is registered in the monitored device master data, the procedure moves to S1308. In S1308, the management server 106 refers to the method included in the request and determines whether or not the request is a communication test request. If the request received in S1308 is a communication test, the procedure moves to S1310 after executing S1313 and S1314. In S1310, the management server 106 executes communication processing for the notification setting information request (getConfiguration method) sent from the device monitoring module. This notification setting information request corresponds to S208 in FIG. 2. If, in S1308, it is determined that the communication method is not a communication test, the procedure moves to S1309, where schedule-type communication processing is executed. The getConfiguration communication processing and schedule-type communication processing shall be explained using the flowcharts in FIGS. 14 and 16 respectively.

<Detailed Flowchart for S1310>

Figure 14:
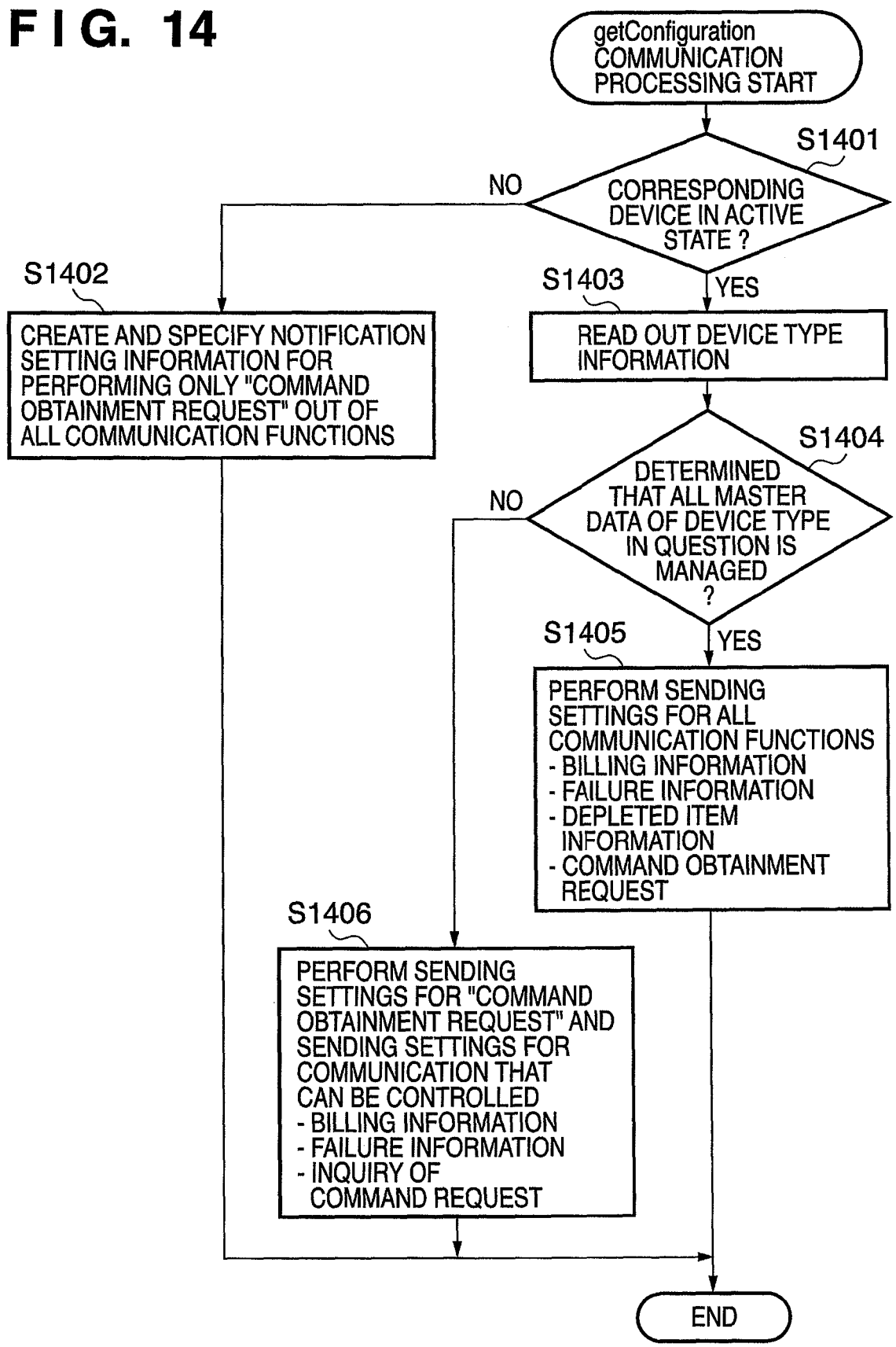
FIG. 14 is a flowchart illustrating a flow of operations when a management server 106 receives a schedule request from a device, according to an embodiment of the present invention.

FIG. 14 illustrates, in detail, the notification setting information request (getConfiguration) communication processing of S1310 in FIG. 13. When the getConfiguration communication processing is commenced, in S1401, the active or inactive status of the monitored device master data is determined by referring to the monitoring activity flag 1104. The procedure moves to S1402 in the case where the monitoring activity flag of the device in question is "inactive". In S1402, notification setting information for sending only a command obtainment request, out of all the communication functions, is created, and this notification setting information is sent to the device in question as a communication response. Communication from devices not currently being monitored can be kept to a minimum in this manner. The reason for configuring the command obtainment request is as follows: in the future, when the monitoring activity flag 1104 has become active, it will be necessary to once again alter the sending settings of the device in question and control the device so as to send the necessary data. If monitoring has been set to inactive for the device ID retrieved in S1401, in S1402, notification setting information instructing the device to send the command obtainment request without making a notification of the status code is created. The created notification setting information is remotely instructed to the device. Then, the getConfiguration communication processing of FIG. 14 ends.

If, in S1401, the device is in an active state, the procedure moves to S1403, where the corresponding device type-dependent device master data is read out from the device type information of the device in question. Here, in the case where the determination in S1401 is "YES", there are situations where the device having the same device ID is once again set as being active for monitoring after the remote instructions in S1402 have been performed. A situation where, for example, remote monitoring of the user's device is temporarily stopped, following which remote monitoring is once again started, corresponds to such a situation.

Next, the procedure moves to S1404, where notification setting information is created (see FIG. 7) with reference to the device type-dependent master data and sent to the device. In order to create this information, for example, the format shown in FIG. 7 may be prepared in advance as a template, and the sending settings may be switched between ON and OFF in accordance with the presence or absence of attribute information. For attribute information requiring a sending start time, the current time, for example, may be set as the sending start time. For attribute information requiring a sending interval, a predetermined length may be set as the sending interval.

Note that in FIG. 14, the processes from S1404 and on are executed as per the following explanations. In other words, in S1404, it is determined whether the management server 106 can process all of the attribute information. The procedure moves to S1405 in the case where this determination is positive. However, the procedure moves to S1406 in the case where it is determined that not all of the attribute information can be processed. In S1405, the management server 106 makes a communication setting activating all functions it can manage for the devices that have communicated with it, and sends sending setting information to the corresponding devices as a response to the communication. In S1406, it is determined what types of communication are controllable based on the attribute information registered in the device type-dependent device master data, and the sending setting information is specified (sent) as a response to the device that performed the request. This getConfiguration communication processing is completed by returning the sending settings to the device in the respective steps. "Controllable" as mentioned here refers to the management server 106 being able to obtain maintenance information corresponding to a received status code from the database upon receiving some type of status code from a device and present information to a user, such as an operator, that that operator is to respond to.

<Detailed Flowchart for S1311>

Figure 15:
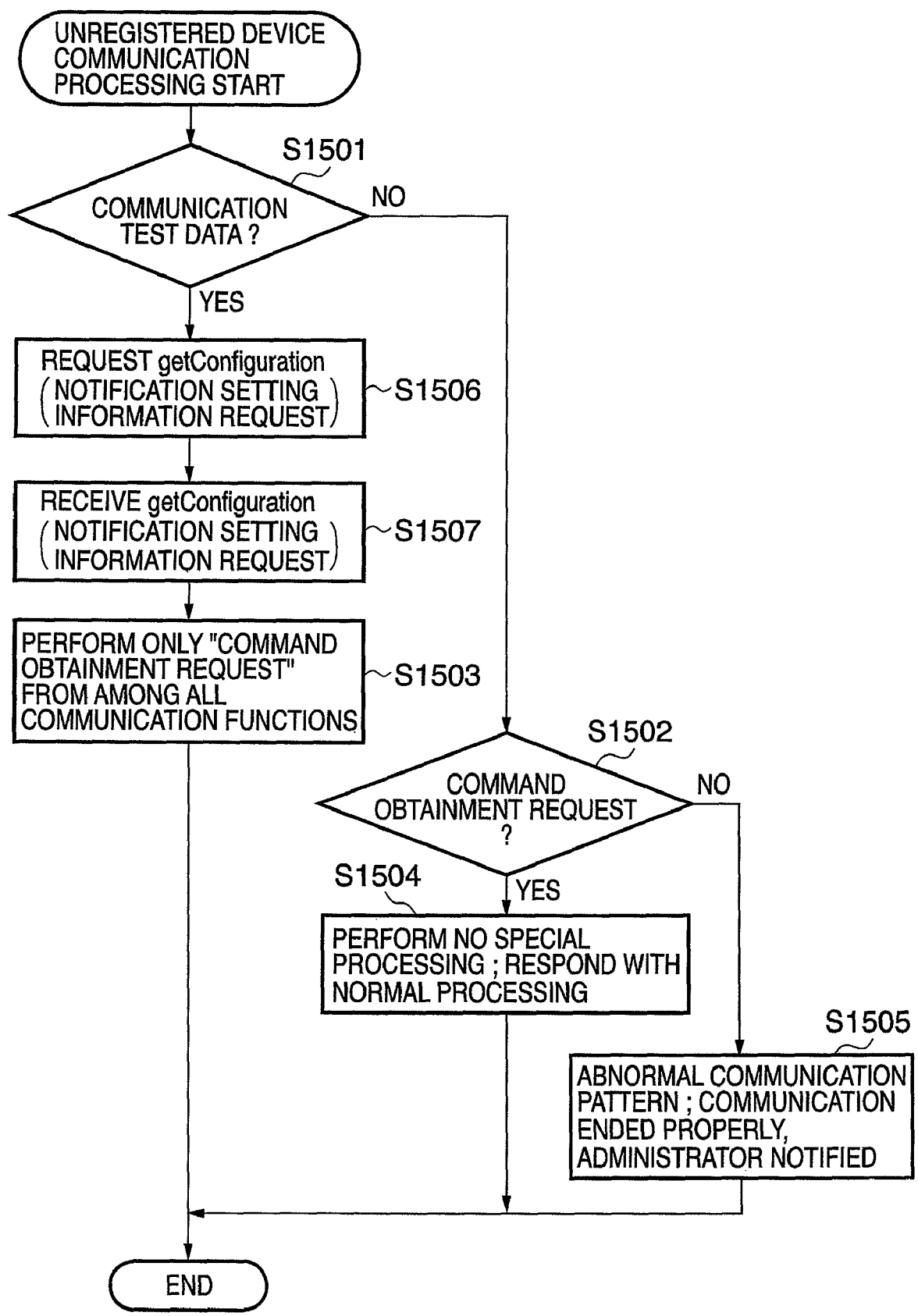
FIG. 15 is a flowchart illustrating a flow of operations when a management server 106 receives a request from an unregistered device, according to an embodiment of the present invention.

FIG. 15 illustrates the details of unregistered device communication processing, indicated by S1311 in FIG. 13. When the unregistered device communication processing commences, in S1501, it is determined whether the method included in the message received indicates a communication test, or if the method indicates something else. If the method indicates a communication test, the procedure moves to S1503 after S1506 and S1507 are executed. In S1503, notification setting information that activates only a command obtainment request, out of all the communication functions, is created, and this created notification setting information is sent as a communication response. This completes the sending specification made to the device. However, in S1501, if the method is determined to not be a communication test, the procedure moves to S1502. In S1502, it is checked whether the received message is a command obtainment request or if the received message is something else. Here, if the communication is a command obtainment request, the procedure moves to S1504; no processing is executed in regards to this communication, and information indicating that communication has been successfully completed is sent to the device. On the other hand, if, in S1502, the message is determined not to be a command obtainment request, the procedure moves to S1505; because this indicates that a failure may have occurred between the system and the device, the system administrator is notified of this fact. This notification may be communicated to the system administrator by outputting a message, such as a display, audio, or the like.

<Schedule-Type Communication Processing of Detailed Flowchart for S1309>

Figure 16:
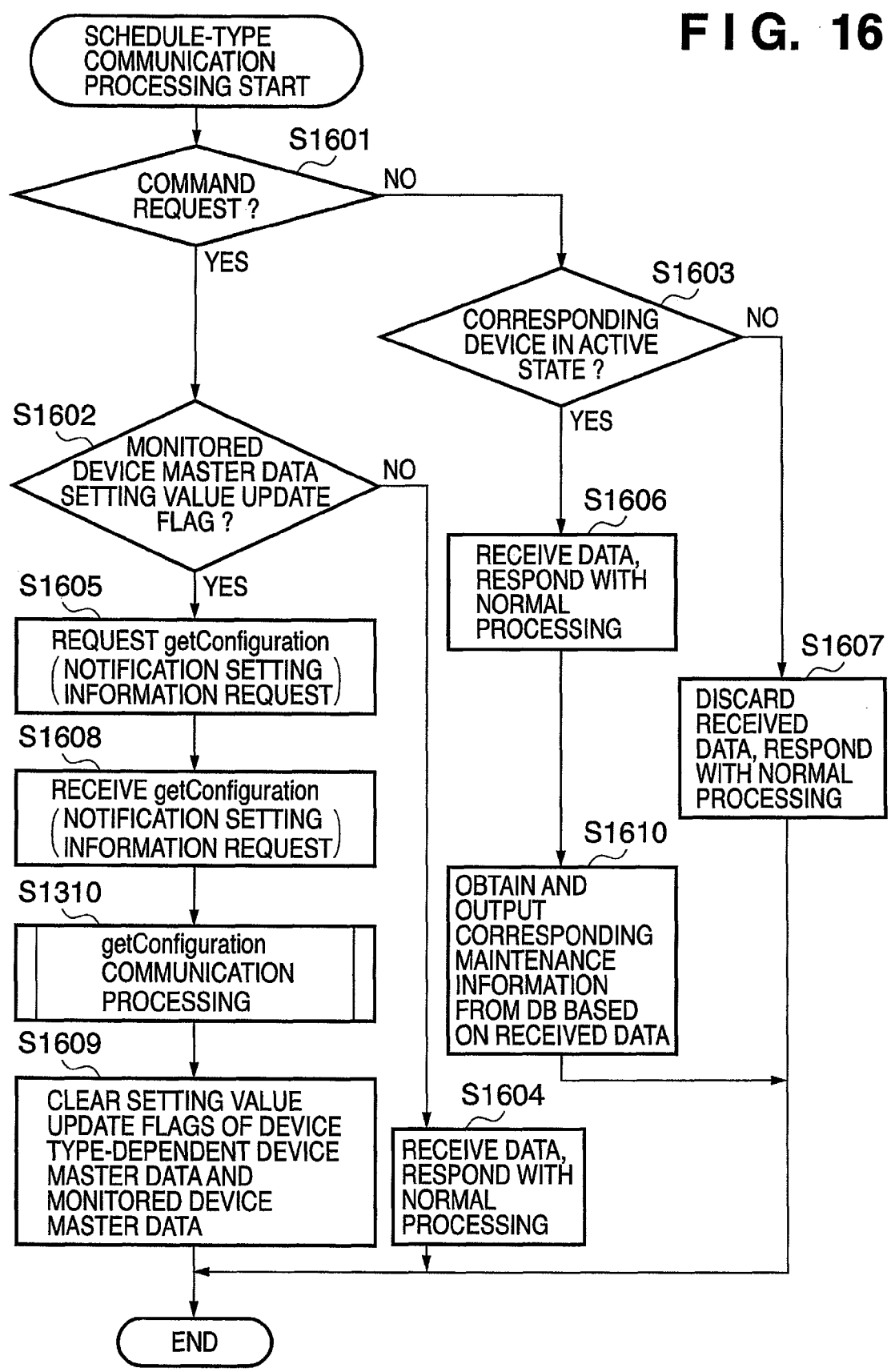
FIG. 16 is a flowchart illustrating a flow of operations when a management server 106 receives device monitoring from a device, according to an embodiment of the present invention.

FIG. 16 illustrates the details of schedule-type communication processing, indicated by S1309 in FIG. 13. When the schedule-type communication processing commences, in S1601, it is determined whether the type of communication is a command obtainment request or if the type of communication is something else. If it is determined, through this checking processing, that the type of communication is a command obtainment request, the procedure moves to S1602. If the type of communication is something else, the procedure moves to S1603.

In S1603, the monitoring activity flag 1104 of the monitored device master data is referred to, and if the flag is set as "active", the procedure moves to S1606. In S1606, communication data including a status code is received and saved in the database illustrated in FIG. 5. Then, a response is made to the device monitoring module indicating that the received data was normally processed.

Next, in S1610, maintenance information associated with the received data (status code) is read out and obtained from the device type-dependent device master data DB 511. The obtained maintenance information is output. Various formats may be applied when outputting the maintenance information so as to make this information visible; for example, the information can be communication over a network, sent by email to a predetermined device via the network interface 305, or displayed on a monitor using the display unit 309.

On the other hand, in the case where, in S1603, the device is set to an inactive state, the procedure moves to S1607, where the received data is discarded and a response is made to the device indicating that communication ended normally.

In S1602, referring to the setting value update flag 1119 of the monitored device master data, the maintenance information stored in the database is determined to be updated. In the case where the setting value update flag is set here, the procedure moves to S1605, and a message requesting a notification setting information request (getConfiguration method) is sent to the device being communicated with (S219 in FIG. 2). After this, once the notification setting information request (getConfiguration) has been received in S1608, the getConfiguration communication processing of S1310 (FIG. 14) is executed. When this process is completed, in S1609, the setting value update flag 1119 of the monitored device master data of the device in question is cleared.

If, in S1602, the setting value update flag 1119 of the monitored device master data is not set, the procedure moves to S1604. In S1604, processing for notifying the device monitoring module that the communication data has been properly received and processing has ended normally is executed.

By performing the operations described thus far, information sufficient in terms of the information required by the management server 106 when managing a device can be received from the device that is to be managed; hence efficient device management, in which network bandwidth and hardware resources are not used in a wasteful manner, can be realized.

<Example of Device Operation in Present Embodiment>

An example of operations performed by a device according to the present embodiment shall be explained assuming the configuration illustrated in FIG. 11. The present operational example illustrates the device monitoring module acknowledging the communication method when a specification has come from the management server 106 as a response to the command obtainment request, and executing differing processes depending on the method.

Figure 17:
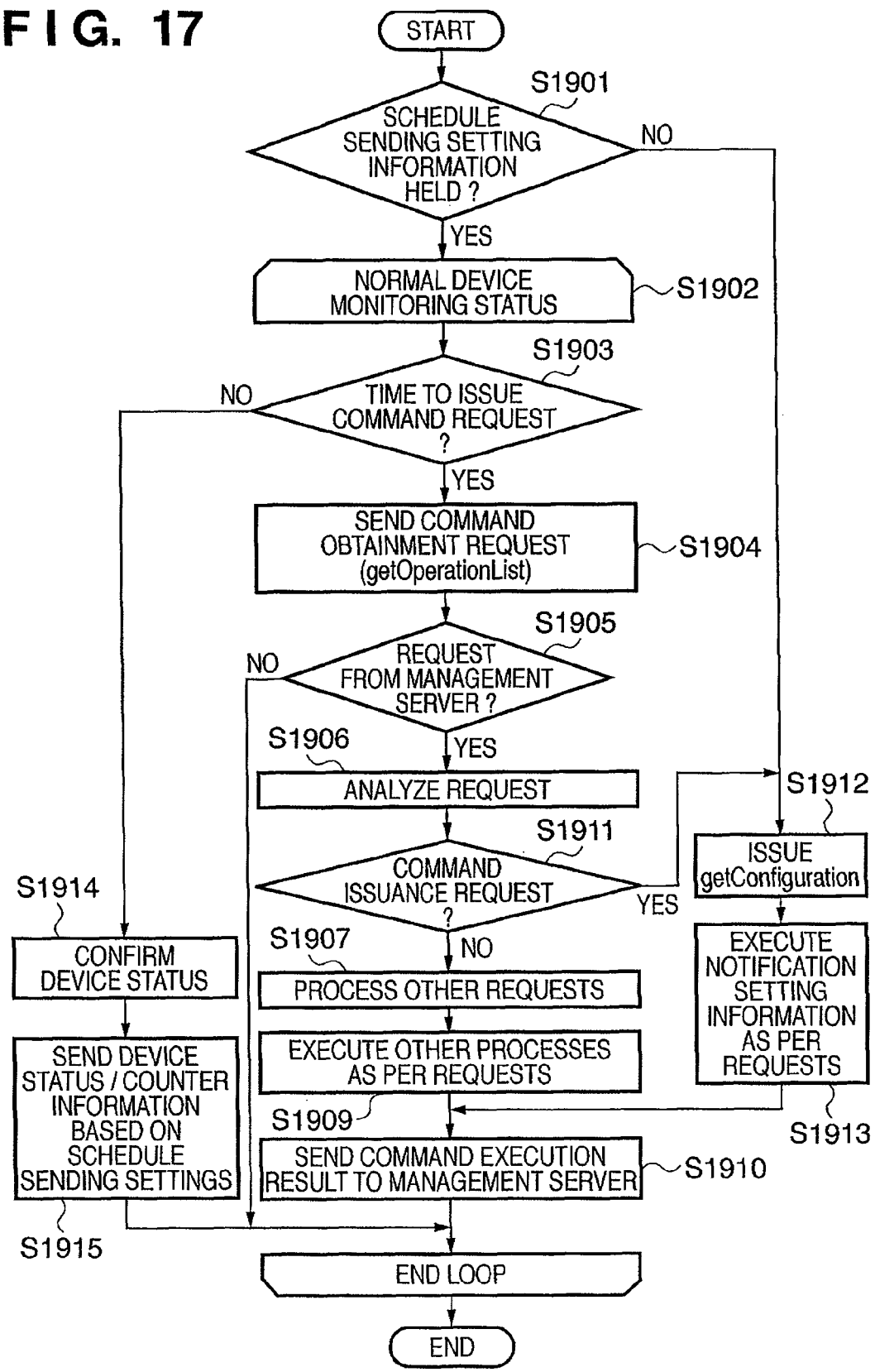
FIG. 17 is a flowchart illustrating a flow of operations when a device receives a setting command from a management server 106, according to an embodiment of the present invention.

FIG. 17 is a flowchart illustrating processing regarding actions taken when the power of the device monitoring module is turned on and the module enters the normal device monitoring mode, or actions taken when the command obtainment request is received from the management server 106.

In S1901, the device monitoring module is started up, and it is determined whether or not notification setting information is held. In the case where notification setting information is held, the procedure moves to S1902, where the device monitoring module enters a normal device monitoring state. If, in S1901, notification setting information is not held, the procedure moves to S1912, where a request for notification setting information is made to the management server 106.

After entering into the normal monitoring state in S1902, the device monitoring module determines, in S1903, whether the issue period of the command obtainment request within the notification setting information has passed. In the case where the issue time of the command obtainment request has not been reached, the procedure moves to S1914, and the status of the device is read out. Then, in S1915, the device monitoring module sends the other device status data to the management server 106 based on the notification setting information.

If, in S1903, the device monitoring module matches the issue conditions of the command obtainment request, the procedure moves to S1904, and sends a command obtainment request (getOperationList) to the management server 106. In S1905, the module stands by for a command obtainment request from the management server 106. In the case where there is no request, that is. the operation has timed out, the processing ends, and returns to the loop. In the case where the request has been received from the management server 106, the procedure moves to S1906, where the details of that message are analyzed. If the analysis results show that the received request is a command issuance request, the procedure moves from S1911 to S1912, where a notification setting information request (getConfiguration) is sent. After this, in S1913, the notification setting information is received from the management server 106, which is saved as the notification setting information of the device monitoring module itself. Of course, the notification setting information may be processed as appropriate and saved thereafter rather than simply being saved as-is. After this, in S1910, command execution results are sent to the management server 106, and the processing finishes. However, in the case where a different request is received in S1911 instead of a command issuance request, the specified command is executed in S1909, and the procedure moves to S1910. In S1910, command execution results are sent to the management server 106, and the processing finishes.

If, in S1901, it is determined that the device monitoring module holds notification setting information after startup, the procedure moves to S1912, whereupon a notification setting information request (getConfiguration) is issued. After this, in S1913, the received notification setting information is saved as the notification setting information of the device monitoring module itself, after which the procedure moves to S1910. In S1910, command execution results are sent to the management server 106, and the processing finishes.

Through the above procedures, the management server according to the present embodiment can update the notification setting information held by the device monitoring module so that the device monitoring module sends attribute information in accordance with the type of information the management server is to process. Updating of the notification setting information is performed without the administrator, user, or the like. For this reason, useless information to be discarded by the management server is not included in the information sent from the device monitoring module to the management server, making it possible to suppress wasteful network traffic. Furthermore, the processing resources of the management server are not wastefully used, making it possible to improve the processing efficiency.

It is not possible to make use of data regarding devices for which master data has not been prepared in the management server, even if data from such a device has been received. Therefore, the settings are made so that the server does not obtain the notification from devices for which master data registered for the corresponding device types has not been registered. Through this, network traffic, the CPU and memory resources of the server, and the like can be handled in an efficient manner.

In addition to this, if, in the above embodiment, master data of individual device types is newly registered partway through operation, a notification that corresponds thereto, enabling the registered master data to be put to use, can be changed effectively, and thus the efficient operations of hardware/network resources can be carried out in a dynamic manner.

Note that the present invention may be applied to a system comprising a plurality of devices (for example, a host computer, an interface device, a reader, a printer, and so on), or may be applied to an apparatus comprising a single device (for example, a copy machine, a facsimile device, and so on). Furthermore, the object of the present invention can also be achieved by supplying, to a system or apparatus, a recording medium on which is recorded program code that implements the functionality of the aforementioned embodiment, and by causing a computer of the system or apparatus to read out and execute the program code stored in that recording medium. In such a case, the program code itself, read out from the recording medium, implements the functionality of the aforementioned embodiment, and the program code itself and the recording medium in which the program code is stored constitute the present invention.

Lastly, the scope of the present invention includes the case where an operation system (OS) running on a computer executes all or part of the actual processing based on the instructions in the program code, and the functionality of the aforementioned embodiment is implemented through this processing. Furthermore, the present invention can also be applied in the case where the program code read out from the recording medium is written into a memory provided in a function expansion card installed in the computer or a function expansion unit connected to the computer. In such a case, a CPU provided in that function expansion card or function expansion unit executes all or part of the actual processing based on instructions in the program code written into the memory, and the functionality of the aforementioned embodiment is realized through that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-333868, filed Dec. 11, 2006, which is hereby incorporated by reference herein in its entirety.

What is claimed is:

1. A managing apparatus capable of communication with a plurality of managed devices, the managed devices being managed by the managing apparatus, and the managing apparatus comprising:
   a first receiver, configured to receive a status code from a managed device according to first notification setting information preliminarily specified to the managed device;
   an obtainment unit, configured to obtain maintenance information associated with the status code received by the first receiver, from a storage that stores maintenance information associated with status codes, the maintenance information being dependent on a model of the managed device;
   an output unit, configured to output the maintenance information obtained by the obtainment unit so as to be visible;
   an update determination unit, configured to determine whether or not the maintenance information stored in the storage has been updated; and
   a specification unit, configured to, in the case where the update determination unit has determined that the maintenance information has been updated, specify, to the managed device, second notification setting information that includes notification settings to which a status code corresponding to the update of the maintenance information is added.

2. The managing apparatus according to claim 1, wherein a firewall is installed in the network environment of the managed device so that the managed device refuses a voluntary access originated from the managing apparatus;
   the managing apparatus further comprises a second receiver, configured to receive an inquiry command, sent voluntarily from the managed device, inquiring whether or not the managing apparatus has new information to be specified; and
   the update determination unit determines whether or not the maintenance information has been updated in accordance with the reception of the inquiry command, and the specification unit specifies the second notification setting information to the managed device in the case where the update determination unit has determined that the maintenance information has been updated.

3. The managing apparatus according to claim 2, further comprising:
   a third receiver, configured to receive a device installation confirmation notification sent from a managed device;
   a searching unit, configured to search out, from the storage, device identification information included in the device installation confirmation notification received by the third receiver, and
   a request unit, configured to request the inquiry command from the managed device in the case where the result of the search performed by the searching unit indicates that corresponding device identification information is not registered in the storage.

4. The managing apparatus according to claim 2, further comprising:
   a setting unit, configured to set the device registered in the storage to be active or inactive as a target for monitoring;
   a searching unit, configured to search for whether or not the device identification information included in the inquiry command received by the second receiver is registered in the storage, and
   a request unit, configured to request the inquiry command from the managed device when the device corresponding to the searched-out device identification information is set to be inactive as a target for monitoring.

5. The managing apparatus according to claim 1, further comprising:
   a second receiver, configured to receive a device installation confirmation notification sent from a managed device, wherein
   the specification unit includes a determination unit that, in the case where the device installation confirmation notification has been received by the second receiver, determines a status code stored in association with the maintenance information, from among status codes that can be sent by the managed device to the managing apparatus, based on the maintenance information stored in the storage; and
   the specification unit specifies, to the managed device, third notification setting information including a notification settings for the status code determined by the determination unit to be registered in association with the maintenance information.

6. A management method used in a managing apparatus capable of communication with a plurality of managed devices, the managed devices being managed by the managing apparatus, and the management method comprising:
  a first receiving step of receiving a status code from a managed device according to first notification setting information preliminarily specified to the managed device;
  an obtainment step of obtaining maintenance information associated with the status code received in the first receiving step, from a storage means that stores maintenance information associated with status codes, the maintenance information being dependent on a model of the managed device;
  an output step of outputting the maintenance information obtained by the obtainment step so as to be visible;
  an update determination step of determining whether or not the maintenance information stored in the storage means has been updated; and
  a specification step of, in the case where it has been determined in the update determination step that the maintenance information has been updated, specifying, to the managed device, second notification setting information that includes a notification setting to which a status code corresponding to the update of the maintenance information is added.

7. The management method according to claim 6, wherein
  a firewall is installed in the network environment of the managed device so that the managed device refuses a voluntary access originated from the managing apparatus;
  the management method further comprises a second receiving step of receiving an inquiry command, sent voluntarily from the managed device, inquiring whether or not the managing apparatus has new information to be specified; and
  in the update determination step, it is determined whether or not the maintenance information has been updated in accordance with the reception of the inquiry command, and in the specification step, the second notification setting information is specified to the managed device in the case where it has been determined, in the update determination step, that the maintenance information has been updated.

8. The management method according to claim 7, further comprising:
  a third receiving step of receiving a device installation confirmation notification sent from a managed device;
  a searching step of searching out whether or not device identification information included in an device installation confirmation notification received in the third receiving step is registered in the storage means and
  a requesting step of requesting the inquiry command from the managed device, in the case where the result of the search performed in the searching step indicates that corresponding device identification information is not registered in the storage means.

9. The management method according to claim 7, further comprising:
  a setting step of setting the device registered in the storage means to be active or inactive as a target for monitoring;
  a searching step of searching for whether or not the device identification information included in the inquiry command received in the second receiving step is registered in the storage means, and
  a request step of requesting the inquiry command from the managed device
  when the device corresponding to the searched-out device identification information is set to be inactive as a target for monitoring.

10. The management method according to claim 6, further comprising a second receiving step of receiving a device installation confirmation notification sent from a managed device, wherein
  the specification step includes a determination step of, in the case where the device installation confirmation notification has been received in the second receiving step, determining a status code stored in association with the maintenance information, from among status codes that can be sent by the managed device to the managing apparatus, based on the maintenance information stored in the storage means; and
  in the specification step, third notification setting information including a notification setting for the status code determined in the determination step to be registered in association with the maintenance information is specified to the managed device.

11. A non-transitory computer-readable recording medium on which is recorded a program for causing a computer to function as the managing apparatus according to claim 1.

* * * * *